US012746876B2

(12) United States Patent
Yang

(10) Patent No.: US 12,746,876 B2
(45) Date of Patent: Sep. 29, 2026

(54) APPARATUS FOR CONTROLLING VEHICLE CONVENIENCE EQUIPMENT, AND VEHICLE HAVING THE SAME

(71) Applicants: Hyundai Motor Company, Seoul (KR); Kia Corporation, Seoul (KR)

(72) Inventor: Heegun Yang, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 245 days.

(21) Appl. No.: 18/212,577

(22) Filed: Jun. 21, 2023

(65) Prior Publication Data

US 2024/0067085 A1 Feb. 29, 2024

(30) Foreign Application Priority Data

Aug. 30, 2022 (KR) ........................ 10-2022-0108845

(51) Int. Cl.

*B60Q 9/00* (2006.01)
*B60R 1/00* (2022.01)
*B60R 1/074* (2006.01)
*B60R 1/12* (2006.01)
*B60R 25/01* (2013.01)
*B60Q 1/24* (2006.01)

(52) U.S. Cl.

CPC .............. *B60Q 9/006* (2013.01); *B60R 1/006* (2013.01); *B60R 1/074* (2013.01); *B60R 1/12* (2013.01); *B60R 25/01* (2013.01); *B60Q 1/247* (2022.05); *B60Q 2400/40* (2013.01)

(58) Field of Classification Search

CPC .... B60Q 9/006; B60Q 1/247; B60Q 2400/40; B60R 1/006; B60R 1/074; B60R 1/12; B60R 25/01

See application file for complete search history.

(56) References Cited

U.S. PATENT DOCUMENTS

| | | | | |
|---|---|---|---|---|
| 9,858,735 | B2 * | 1/2018 | Spahl | H04W 52/02 |
| 11,845,382 | B2 * | 12/2023 | Choi | B60W 30/143 |
| 2001/0028296 | A1 * | 10/2001 | Masudaya | G07C 9/00309 340/10.3 |
| 2005/0017853 | A1 * | 1/2005 | Baschnagel, III | B60R 25/1001 340/426.1 |
| 2014/0218212 | A1 * | 8/2014 | Nykerk | B60Q 1/247 340/901 |
| 2015/0057896 | A1 * | 2/2015 | Yamane | B60J 5/047 701/49 |

(Continued)

*Primary Examiner* — Justin R. Blaufeld

(74) *Attorney, Agent, or Firm* — MORGAN, LEWIS & BOCKIUS LLP

(57) ABSTRACT

An apparatus for controlling a vehicle convenience equipment includes a communicator configured to communicate with an obstacle detector and an external device, and a processor communicatively connected to the communicator and configured to obtain distance information with the external device during communication with the external device, determine whether a side obstacle exists based on obstacle information detected by the obstacle detector, obtain distance information with the side obstacle upon concluding that the side obstacle exists, control a side mirror in a folded state to an unfolded state thereof or to maintain the folded state thereof based on the distance information with the external device and the distance information with the side obstacle.

16 Claims, 11 Drawing Sheets

(56) References Cited

U.S. PATENT DOCUMENTS

| | | | | |
|---|---|---|---|---|
| 2015/0161834 | A1* | 6/2015 | Spahl | H04W 52/02 340/5.61 |
| 2015/0203038 | A1* | 7/2015 | Haeussler | B60R 1/062 701/49 |
| 2016/0107579 | A1* | 4/2016 | Quinn | B60R 1/074 359/841 |
| 2017/0103594 | A1* | 4/2017 | Kim | G07C 9/00309 |
| 2017/0190318 | A1* | 7/2017 | Imamura | H04W 76/11 |
| 2018/0027634 | A1* | 1/2018 | Dalavayi | H05B 47/11 315/77 |
| 2018/0056938 | A1* | 3/2018 | Shin | B60R 25/24 |
| 2018/0162278 | A1* | 6/2018 | Hasegawa | H02P 5/68 |
| 2018/0290594 | A1* | 10/2018 | Abdel-Rahman | B60R 1/06 |
| 2019/0031105 | A1* | 1/2019 | Kim | B60R 1/081 |
| 2019/0047473 | A1* | 2/2019 | Pohl | G08G 1/166 |
| 2019/0056749 | A1* | 2/2019 | Kim | B60R 1/28 |
| 2020/0117885 | A1* | 4/2020 | Lee | G06V 20/56 |
| 2020/0406821 | A1* | 12/2020 | Salter | G01V 3/08 |
| 2021/0086789 | A1* | 3/2021 | Oyama | B60R 1/12 |
| 2022/0203896 | A1* | 6/2022 | Choi | B60R 1/062 |
| 2022/0348164 | A1* | 11/2022 | Manickam | B60R 25/01 |
| 2023/0128034 | A1* | 4/2023 | Keshipeddy | G01S 13/931 342/70 |

* cited by examiner

APPARATUS FOR CONTROLLING VEHICLE CONVENIENCE EQUIPMENT, AND VEHICLE HAVING THE SAME

CROSS-REFERENCE TO RELATED APPLICATION(S)

The present application claims priority to Korean Patent Application No. 10-2022-0108845, filed on Aug. 30, 2022, the entire contents of which is incorporated herein for all purposes by this reference.

BACKGROUND OF THE PRESENT DISCLOSURE

Field of the Present Disclosure

The present disclosure relates to a control device configured for conveniently controlling a side mirror, and a vehicle including the same.

Description of Related Art

Generally, vehicles include a rear view mirror providing a rear view and outside mirrors (also referred to as side mirrors) providing left and right rear views.

A side mirror protrudes from a door of a vehicle. As a result, the side mirrors may cause hindrances of pedestrians passing around the vehicle, and also be damaged due to collision with other structures or the like. To address disadvantages, a folding manner to a side mirror has been developed to reduce the degree of protrusion of the side mirror by folding the side mirror toward a vehicle body at a certain angle.

Recently, in accordance with development of communication technology, side mirrors have reached a level where the side mirrors are automatically folded/unfolded in response to a door lock/unlock signal from a remote controller.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control device configured for conveniently controlling folding or unfolding of a side mirror based on a distance from/to a side obstacle when approach of a user is detected in a parked state, and a vehicle including the same.

Additional aspects of the present disclosure will be set forth in part in the description which follows, and in part, will be obvious from the description, or may be learned by practice of the present disclosure.

In accordance with an aspect of the present disclosure, an apparatus for controlling a vehicle convenience equipment is provided. The apparatus includes a communicator configured to communicate with an obstacle detector and an external device, and a processor communicatively connected to the communicator and configured to obtain distance information with the external device during communication with the external device, determine whether a side obstacle exists based on obstacle information detected by the obstacle detector, obtain distance information with the side obstacle upon concluding that the side obstacle exists, control a side mirror in a folded state to an unfolded state thereof or to maintain the folded state thereof based on the distance information with the external device and the distance information with the side obstacle.

The processor may be further configured for determining whether a distance with the external device is less than or equal to a first reference distance based on the distance information with the external device, determine whether a distance with the side obstacle is less than or equal to a second reference distance based on the obstacle information detected by the obstacle detector, and control the side mirror to maintain the folded state thereof upon concluding that the distance with the external device is less than or equal to the first reference distance and the distance with the side obstacle is less than or equal to the second reference distance.

The processor may be further configured to control the side mirror to be in the unfolded state upon concluding that the distance with the external device is less than or equal to the first reference distance and the distance with the side obstacle exceeds the second reference distance.

The external device may include at least one of a remote controller or a terminal.

The processor may be further configured to, upon concluding that an unfolding instruction for the side mirror is received from the remote controller or the terminal, determine whether the distance with the side obstacle is less than or equal to the second reference distance based on the distance information with the side obstacle, and control the side mirror to maintain the folded state thereof upon concluding that the distance with the side obstacle is less than or equal to the second reference distance.

The processor may be further configured to transmit, when controlling the side mirror to be in the unfolded state, a lighting instruction to a puddle lamp provided in the side mirror.

The side obstacle may exist on a position facing the side mirror.

In accordance with another aspect of the present disclosure, a vehicle includes a vehicle body, a side mirror disposed on the vehicle body, an adjusting member provided on the side mirror and configured to rotationally move the side mirror into a folded state or an unfolded state, a communicator configured to communicate with an external device, an obstacle detector configured to detect an obstacle, and a processor configured to obtain distance information with the external device when the vehicle is in a parked state and in a state in which communication with the external device is available, determine whether the obstacle exists on a side of the vehicle body based on obstacle information detected by the obstacle detector, obtain distance information with the obstacle upon concluding that the obstacle exists, and control the adjusting member to switch the side mirror in a folded state to an unfolded state thereof or to maintain the folded state thereof based on the distance information with the external device and the distance information with the obstacle.

The processor may be further configured for determining whether a distance with the external device is less than or equal to a first reference distance based on the distance information with the external device, determine whether a distance with the obstacle is less than or equal to a second reference distance based on the obstacle information detected by the obstacle detector, and control the adjusting member to maintain the folded state of the side mirror upon concluding that the distance with the external device is less than or equal to the first reference distance and the distance with the obstacle is less than or equal to the second reference distance.

The processor may be further configured to control the adjusting member to switch the side mirror to be in the unfolded state upon concluding that the distance with the external device is less than or equal to the first reference distance and the distance with the obstacle exceeds the second reference distance.

The external device may include at least one of a remote controller or a terminal, and the processor is further configured to, upon concluding that an unfolding instruction for the side mirror is received from the remote controller or the terminal, determine whether a distance with the obstacle is less than or equal to the second reference distance based on the obstacle information, and control the adjusting member to allow the folded state of the side mirror to be maintained upon concluding that a distance with the obstacle is less than or equal to the second reference distance.

The vehicle may further include a puddle lamp disposed in the vehicle body, wherein the processor is configured to control lighting of the puddle lamp when switching the side mirror to the unfolded state.

The vehicle may further include a camera, wherein the processor is further configured for determining whether a distance with the external device is less than or equal to a predetermined distance based on the distance information with the external device, activate the camera upon concluding that the distance with the external device is less than or equal to the predetermined distance, and recognize a location of a user based on image information obtained by the activated camera.

The processor may be further configured for determining whether a distance with the user is less than or equal to a first reference distance based on the recognized location of the user, determine, upon concluding that the distance with the user is less than or equal to the first reference distance, whether a distance with the obstacle is less than or equal to a second reference distance based on the obstacle information detected by the obstacle detector, and control the adjustment member to maintain the folded state of the side mirror upon concluding that the distance with the obstacle is less than or equal to the second reference distance.

The processor may be further configured to control the adjustment member to switch the side mirror to be in the unfolded state upon concluding that the distance with the user is less than or equal to the first reference distance and the distance with the obstacle exceeds the second reference distance.

The side mirror may include a first side mirror disposed on a driver seat side door and a second side mirror disposed on a passenger side door, and the processor is further configured for determining, based on the distance information with the external device, whether a distance with the external device is less than or equal to a first reference distance, obtain, upon concluding that the distance with the external device is less than or equal to the first reference distance, distance information with a left side obstacle and distance information with a right side obstacle existing on the left and right sides of the vehicle body, determine, based on the obtained distance information with the left obstacle, whether a distance with the left side obstacle is less than or equal to a second reference distance, determine, based on the obtained distance information with the right obstacle, whether a distance with the right side obstacle is less than or equal to the second reference distance, identify a location of the side obstacle determined to be less than or equal to the second reference distance, and control the adjustment member so that the side mirror corresponding to the identified location of the side obstacle is maintained in the folded state.

The processor may be further configured to identify the location of the side obstacle determined to exceed the second reference distance, and control the adjusting member to switch the side mirror corresponding to the identified location of the side obstacle to the unfolded state.

The processor may be further configured for determining, when the vehicle is changed from a parked state to a driving state while the side mirror is maintained in the folded state, whether a distance with the obstacle exceeds the second reference distance based on the obstacle information detected by the obstacle detector, and control the adjusting member to switch the side mirror in the folded state to the unfolded state upon concluding that the distance with the obstacle exceeds the second reference distance.

The vehicle may further include a camera, wherein the processor is further configured to, when the vehicle is changed from a parked state to a driving state while the side mirror is maintained in the folded state, recognize the obstacle on left and right front sides of the vehicle body based on image information obtained by the camera, and control the adjusting member to switch the side mirror in the folded state to the unfolded state based on the recognized obstacle.

The vehicle may further include a plurality of antennae configured for communicate communicating with the external device, wherein the processor is further configured to recognize, based on a communication order of the plurality of antennae communicating with the external device, a direction and a walking path of a user, and detect approach of the user based on the recognized direction and the recognized walking path of the user.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
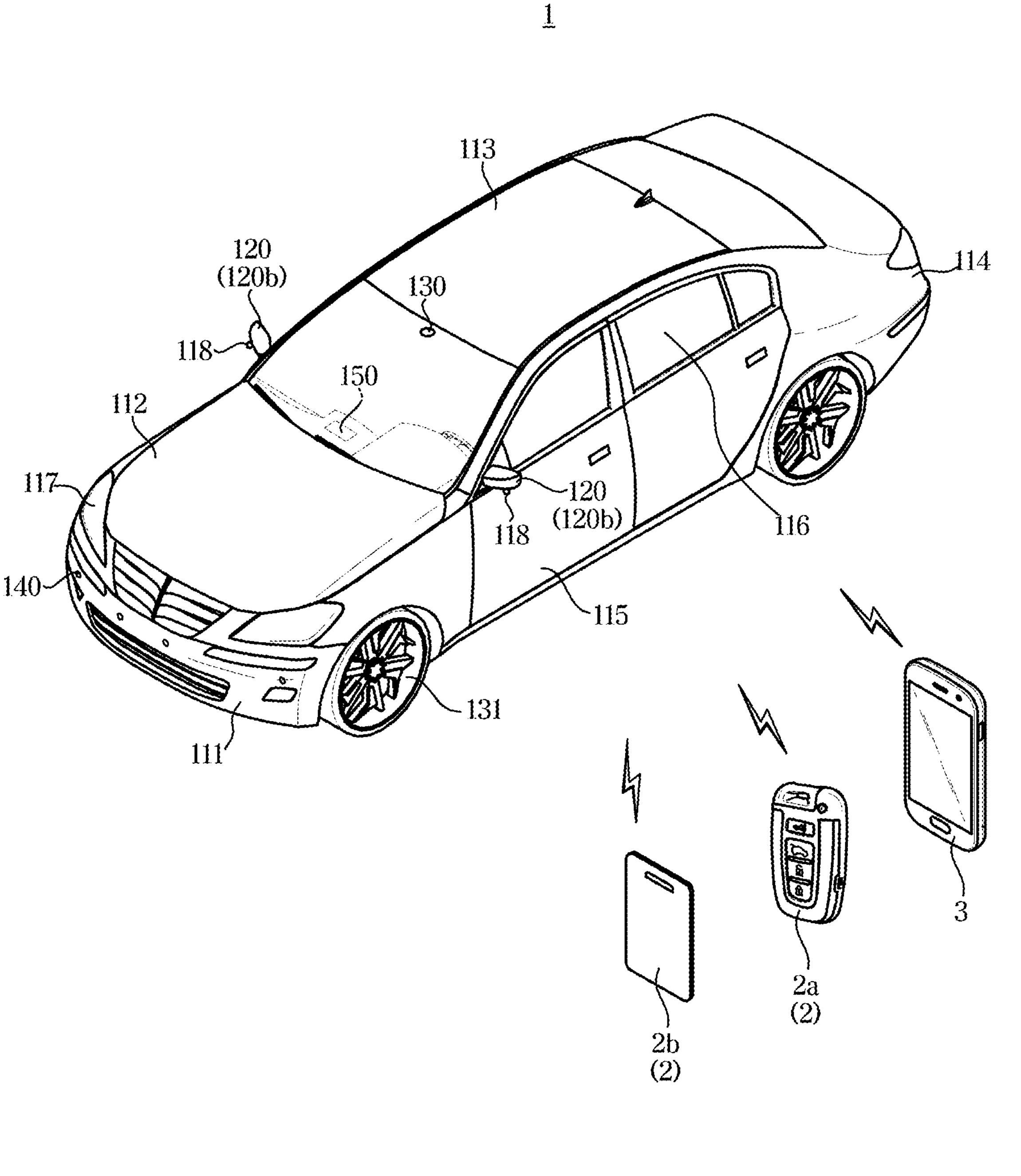
FIG. 1 is a view exemplarily illustrating a communication of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplarily embodiments of the present disclosure, examples of which are illustrated in the accompanying drawings, wherein like reference numerals refer to like elements throughout. The present specification does not describe all elements of the disclosed exemplarily embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it includes a clearly different meaning in the context.

The reference numerals used in operations are used for descriptive convenience and are not intended to describe the order of operations and the operations may be performed in a different order unless otherwise stated.

Hereinafter, various embodiments of the present disclosure will be described in detail with reference to the accompanying drawings.

Figure 2:
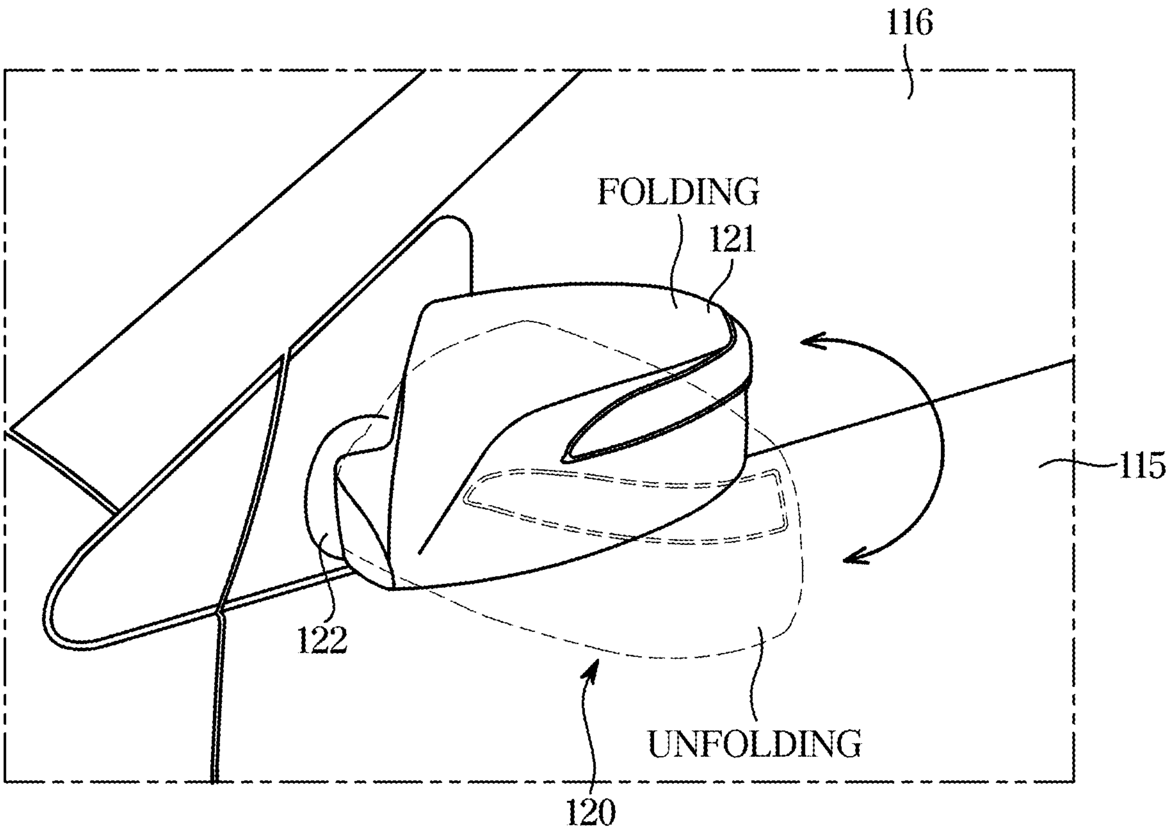
FIG. 2 is a view exemplarily illustrating a side mirror provided in a vehicle according to an exemplary embodiment of the present disclosure.
Figure 3:
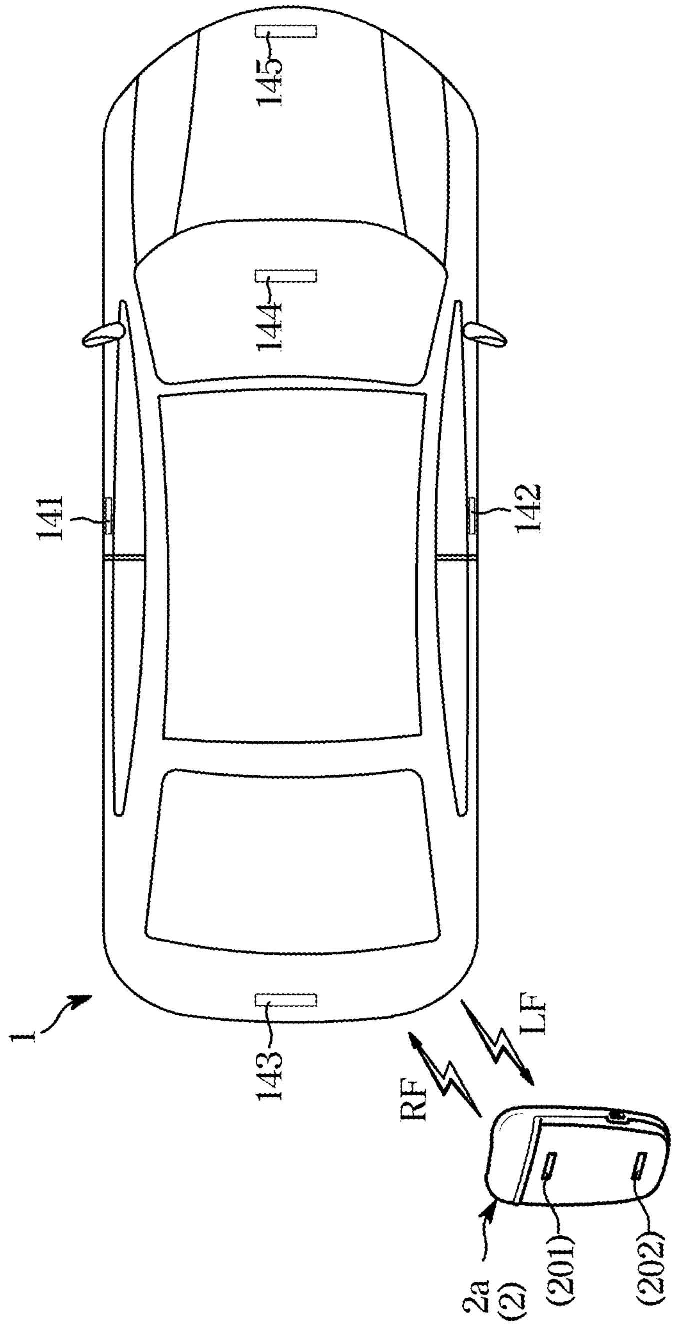
FIG. 3 is a view exemplarily illustrating an arrangement of antennae provided in a vehicle according to an exemplary embodiment of the present disclosure.
Figure 4:
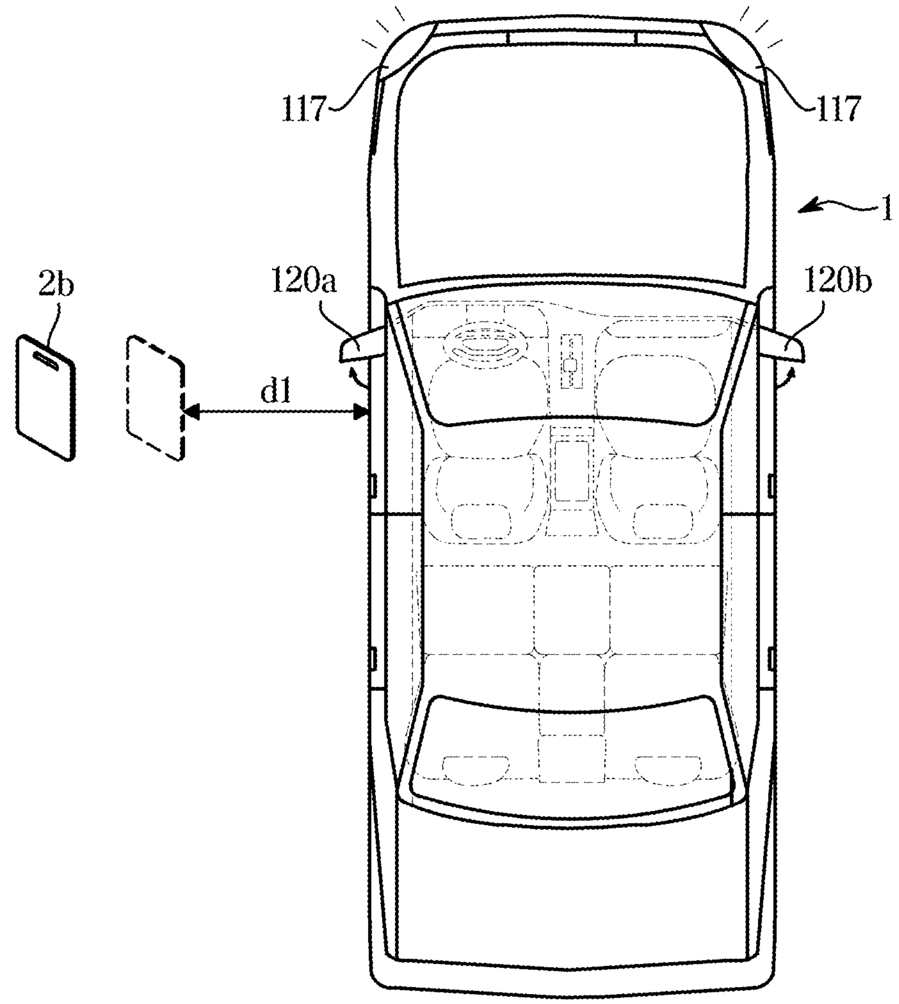
FIG. 4 is a view exemplarily illustrating a communication between a vehicle and a remote controller according to an exemplary embodiment of the present disclosure.

FIG. 1 is a view exemplarily illustrating a communication of a vehicle according to an exemplary embodiment of the present disclosure, FIG. 2 is a view exemplarily illustrating a side mirror provided in a vehicle according to an exemplary embodiment of the present disclosure, FIG. 3 is a view exemplarily illustrating an arrangement of antennae provided in a vehicle according to an exemplary embodiment of the present disclosure, and FIG. 4 is a view exemplarily illustrating a communication between a vehicle and a remote controller according to an exemplary embodiment of the present disclosure.

As shown in FIG. 1, a vehicle 1 may communicate with at least one of remote controllers 2*a*, 2*b* (collectively, 2) or a terminal 3.

First, a configuration of the vehicle 1 will be described.

The vehicle 1 includes a body including an interior and an exterior thereof, and a chassis in which mechanical devices required for driving are provided as the remaining portions except for the body.

The exterior of the vehicle body may include a front panel 111, a bonnet 112, a roof panel 113, a rear panel 114, a plurality of doors 115 (front, rear, left and right doors), and window glass 116 provided to open or close each door 115.

Furthermore, the exterior of the vehicle body may further include a light 117 that enables users to see surrounding information while keeping an eye on a forward field of view and serves as signals and communication for other vehicles and pedestrians, pillars provided at the boundary between the window glasses of the plurality of doors, a puddle lamp 118 configured for performing a welcome function, and a side mirror 120 configured for providing a driver with a backward field of view of the vehicle 1.

The puddle lamp 118 may be disposed at the bottom portion of the side mirror 120 or a handle of the door 115.

The puddle lamp 118 may be turned off when the vehicle is in a parked state and a distance to a user exceeds a first reference distance.

The puddle lamp 118 may be turned on when the vehicle is in the parked state and the distance to the user is less than or equal to the first reference distance. As a result, it is possible for the user to secure the field of views around the vehicle.

The puddle lamp 118 may be turned on when the vehicle is in the parked state, an ambient illumination is less than or equal to a reference illumination, and the distance to the user is less than or equal to the first reference distance.

The side mirror 120 may include a first side mirror 120*a* disposed at an exterior of the door of a driver side and a second side mirror 120*b* disposed at an exterior of the door of a front passenger seat.

As shown in FIG. 2, the first and second side mirrors 120*a* and 120*b* may be automatically folded or unfolded in response to a door lock/unlock instruction or a starting ON/OFF instruction provided in the vehicle. In other words, the side mirrors 120*a* and 120*b* may perform folding and unfolding operations.

Each of the side mirrors 120*a* and 120*b* include a housing 121 forming an external appearance and a mirror member provided inside the housing 121 so that a reflective surface is externally exposed thereto.

In the instant case, to minimize wind resistance acting on the side mirrors 120*a* and 120*b*, the housing 121 may be formed in a curved shape.

The mirror members of the side mirrors 120*a* and 120*b* may be provided inside the housing 121 so that the reflective surface reflecting an object behind the vehicle is externally exposed thereto.

The side mirrors 120*a* and 120*b* may include adjusting members 122*a* and 122*b* (collectively, 122) for folding and unfolding operations. Herein, the adjusting members 122*a* and 122*b* may include a motor as an actuator.

The side mirrors 120*a* and 120*b* may maintain a folded state while the vehicle is in the parking state and an unfolded state while the vehicle is in a driving state, in response to an operation of the adjusting members 122*a* and 122*b*.

The chassis of the vehicle is a frame that supports the vehicle body, and may be provided with a power device, a steering device, and a braking device, which are configured for applying a driving force, a braking force, and a steering force to front, rear, left and right wheels, a steering device, a braking device, respectively, and may be further provided with a suspension device, a transmission device, and the like.

The vehicle may further include a camera 130 configured for obtaining an image of surrounding environments and an obstacle detector 140 configured for detecting an obstacle therearound.

The camera 130 detects object information around the vehicle to convert the detected information into electrical video signals. For example, the camera detects object information on front, left and right sides of a host vehicle and transmits the video signals of the detected object information to a processor 180 (see FIG. 5).

The camera 130 may include a charge couple device (CCD) or a complementary metal-oxide-semiconductor (CMOS) image sensor, and may include a camera using infrared rays.

The camera 130 may be provided around the driver seat inside the vehicle, and may be provided so that the field of view faces the outside of the vehicle to obtain an image of the outside of the vehicle.

The camera 130 may be rotatably provided in the vehicle so that the field of view is adjusted.

The camera 130 may be a front camera, a rear camera, a camera of a black box, or a camera of an autonomous driving control device configured for autonomous driving.

The camera 130 may be provided on a rear view mirror or a roof panel inside the vehicle to be externally exposed of the vehicle, or may be provided on a license plate in front of the vehicle, a grill in front of the vehicle, or an emblem in front of the vehicle.

The camera 130 may be provided on a license plate at the rear of the vehicle, an emblem at the rear of the vehicle, or the roof panel 113 at the rear of the vehicle but externally exposed of the vehicle.

The obstacle detector 140 may be activated in response to an approach of users when the vehicle is parked.

The obstacle detector 140 may be activated when the vehicle 1 is in the driving state.

The obstacle detector 140 detects an existence of obstacles and a position of obstacles in front, rear, left and right directions based on a position of the vehicle 1. Herein, the position of the obstacle may include a relative distance and a relative direction to the vehicle 1.

The obstacle detector 140 detects an obstacle located the outside of the host vehicle 1, for example, a stationary object such as a structure disposed adjacent to a road, any other vehicle in front, any other vehicle in the rear, a vehicle approaching from an opposite lane, a pedestrian, and an animal.

In other words, the obstacle detector 140 detects one or more obstacles located on the front, rear, left and right sides of the vehicle and outputs detection information related to the detected obstacles.

The obstacle detector 140 may be provided on at least one of the front panel 111 or the rear panel 114 of the vehicle, and may also be provided on a side sill panel below the door 115.

The obstacle detector 140 may include a radar sensor or a light detection and ranging (LiDAR) sensor.

One or two or more radar sensors may be provided thereon. Two or more radar sensors may be provided on the exterior of the vehicle body, and may be provided in different positions.

One or two or more LiDAR sensors may be provided thereon. Two or more LiDAR sensors are provided on the exterior of the vehicle body, and may be provided in different positions.

The radar sensor is a sensor configured for detecting the position and distance of an object by use of a reflected wave generated by radiation of radio waves when transmission and reception are performed in the same place.

LiDAR sensor is a non-contact distance detection sensor using the principle of laser radar.

LiDAR sensor has higher detection accuracy in a lateral direction than a radio detecting and ranging (RaDAR) sensor, so that accuracy of the process of determining whether a passage ahead exists may be improved.

The obstacle detector 140 may include an ultrasonic sensor. One or two or more ultrasonic sensors may be provided thereon. Two or more ultrasonic sensors are provided on the exterior of the vehicle body, and may be provided in different positions.

The ultrasonic sensor generates ultrasonic waves for a certain time period and then detects a signal which is reflected from an object.

The ultrasonic sensor may be used to determine whether an obstacle such as a pedestrian within a short range exists.

Figure 5:
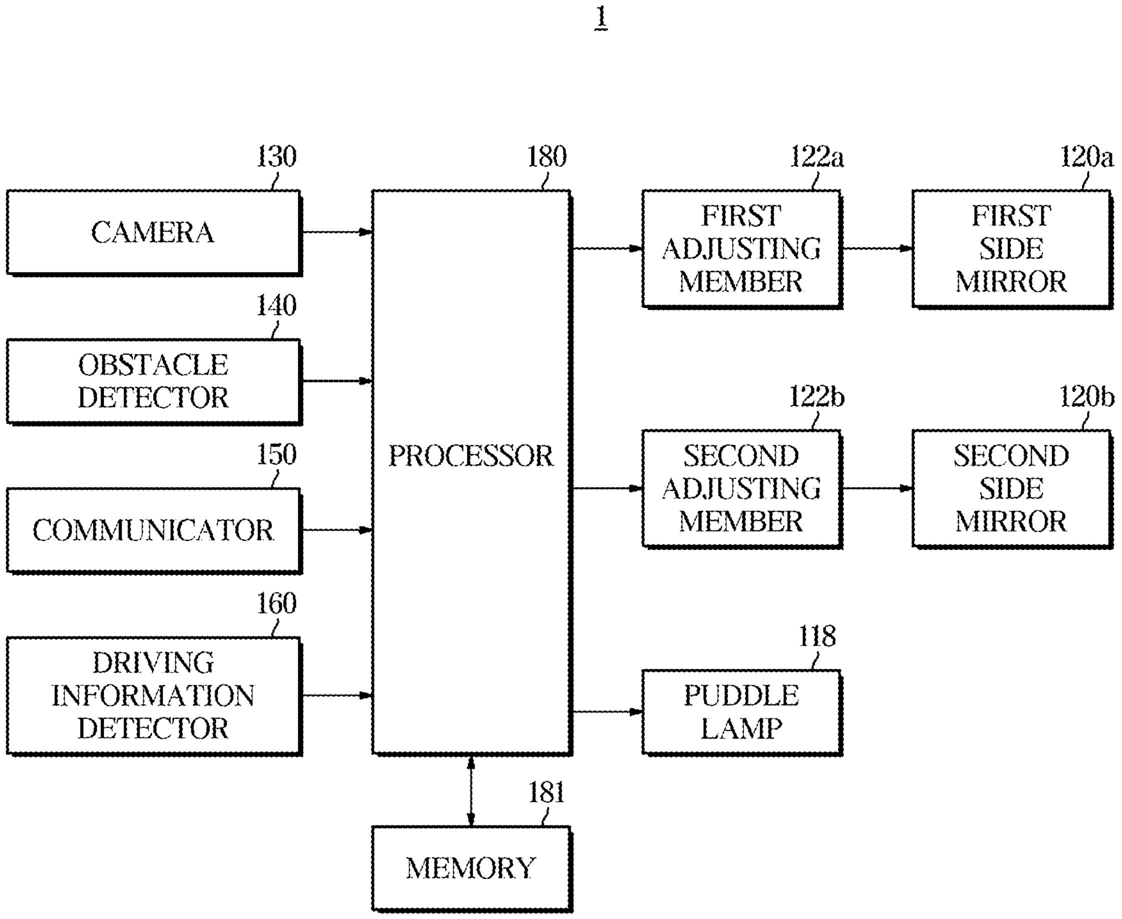
FIG. 5 is a control schematic diagram of a vehicle according to an exemplary embodiment of the present disclosure.

The obstacle detector 140 transmits detection information on an obstacle detection to the processor 180 (see FIG. 5).

The vehicle 1 may further include a communicator 150 configured for communicating with at least one of the remote controller 2 or the terminal 3. Herein, the remote controller 2 may be provided in one or two or more.

The communicator 150 may include one or more components that enables communication between components inside the vehicle, and may include, for example, at least one of a short-range communication module, a wired communication module, or a wireless communication module.

The short-range communication module may include various short-distance communication modules for transmitting and receiving signals using a wireless communication network in a short distance such as, a Bluetooth module, an infrared communication module, a radio frequency identification (RFID) communication module, a wireless local access network (WLAN) communication module, a Near Field Communication (NFC) module, and a Zigbee communication module, and the like.

The wired communication module may include various wired communication modules such as, a local area network (LAN) module, a wide area network (WAN) module, or a value added network (VAN) module, as well as include various cable communication modules such as, a universal serial bus (USB) module, high definition multimedia interface (HDMI), digital visual interface (DVI), recommended standard232 (RS-232), a power line communication, and plain old telephone service (POTS), and the like.

The wired communication module may further include a Local Interconnect Network (LIN).

The wireless communication module, in addition to a Wifi module and a Wireless Broadband (WiBro) module, may include a wireless communication module supporting various wireless communication methods such as, Global System for Mobile communication (GSM), Code Division Multiple Access (CDMA), Wideb and Code Division Multiple Access (WCDMA), Universal Mobile Telecommunications System (UMTS), Time Division Multiple Access (TDMA), Long Term Evolution (LTE), and ultra wide band (UWB) modules, and the like.

The communicator 150 may include a plurality of communication modules. The plurality of communication modules may be different according to the types of external devices that communicate with the vehicle 1.

For example, the communicator 150 of the vehicle 1 may include a first communication module configured for communicating with one or two or more remote controllers 2 and a second communication module configured for communicating with the terminal 3.

As shown in FIG. 2, the first communication module of the vehicle may include at least one of a low frequency communication module or a high frequency communication module.

The low frequency communication module may be a communication module configured for transmitting and receiving a low frequency (LF) signal, and the high frequency communication module may be a communication module configured for receiving a radio frequency (RF) signal transmitted from a remote controller. RF signal may also be referred to as a high frequency (HF).

The first communication module for communicating with the remote controller 2 may include a plurality of antennae 141, 142, 143, 144, and 145.

The plurality of antennae 141-145 may include a first antenna 141 disposed at the door or handle of the driver seat, a second antenna 142 disposed at the door or handle of the front passenger seat, a third antenna 143 disposed at the tailgate or rear panel 114, a fourth antenna 144 disposed in the front of the interior of the vehicle, and a fifth antenna 145 disposed at the bonnet 112 or the front panel 111 of the vehicle.

Arrangement positions of the plurality of antennae are not limited thereto, and may be changed according to various exemplary embodiments of the present disclosure. For example, some of the plurality of antennae may be further provided on the roof panel, the rear window glass, and the door of the rear seat.

The plurality of antennae 141 to 145 provided in the vehicle may or may not be able to communicate with the remote controller 2 depending on a distance between the vehicle and the remote controller 2.

In other words, because the antennae 141 to 145 provided in the vehicle only need to transmit a signal for recognizing the existence of the remote controller 2, low-frequency communication configured for transmitting an amount of information less than a certain amount of information and performing a long-distance communication with the same power is performed.

The plurality of antennae may be the LF antennae.

Furthermore, the first communication module may also include the RF antenna.

The plurality of antennae may selectively transmit radio waves to the remote controller 2.

The vehicle may communicate with the remote controller 2 through the plurality of antennae, automatically communicate with the remote controller 2 if the remote controller 2 presents at a distance where communication with each other is available (i.e., a predetermined distance), and in response to a remote key authentication of the remote controller 2 being successful unlock the doors of the driver seat and the passenger seat of the vehicle or control the starting of the vehicle without a separate manual operation.

As shown in FIG. 4, upon concluding that the distance from/to (or with) the remote controller 2 is less than or equal to a first reference distance d1, that is, the remote controller 2 is located close to the vehicle 1, the vehicle may turn on the light 117, turn on the puddle lamp 118, or unfold the side mirror 120.

When performing unfolding of the side mirror 120 in response to communication with the remote controller 2, the vehicle 1 may recognize surrounding obstacles and limit the unfolding of the side mirror 120 based on the position of the recognized obstacle. This will be explained in detail later.

Upon concluding that the distance with the remote controller exceeds the first reference distance d1, the vehicle may turn off the light 117, turn off the puddle lamp 118, or fold the side mirrors 120.

When performing folding of the side mirror 120 in response to communication with the remote controller 2, the vehicle 1 may recognize surrounding obstacles and limit the folding of the side mirror 120 based on the position of the recognized obstacle.

The second communication module may include one or two or more Bluetooth communication (BLU) modules, an ultra wide band (UWB) communication module, or a Near Field Communication (NFC) module.

When the UWB module is provided in the communicator 150, the communicator may include a plurality of antennae for a UWB communication.

When the BLU module is provided in the communicator 150, the communicator may include an antenna for a Bluetooth communication.

When the NFC module is provided in the communicator 150, the communicator 150 may include an antenna for a short-range wireless communication.

The BLU communication module enables communication within a first area with the radius of a first communication distance L1, the UWB communication module enables communication within a second area with the radius of a second communication distance L2, and the short-distance wireless communication module enables communication within a third area with the radius of a third communication distance L3.

Herein, the first communication distance L1 may be longer than the second communication distance L2, and the second communication distance L2 may be longer than the third communication distance L3.

Upon concluding that there is the terminal 3 at a distance where communication is possible, the vehicle may automatically communicate with the terminal 3, and in response to the electronic key authentication of the terminal 3 being successful, unlock the doors of the driver seat side and the passenger seat side of the vehicle or control the starting of the vehicle without a separate manual operation.

Herein, a communication distance between the vehicle and the terminal is a predetermined distance, and may be different depending on the types of communication modules.

Upon concluding that the distance with the terminal 3 is less than or equal to the first reference distance, that is, the terminal 3 is located near to the vehicle 1, the vehicle may turn on the light 117, turn on the puddle lamp 118, or unfold the side mirror 120.

When performing the unfolding of the side mirror 120 in response to communication with the terminal 3, the vehicle 1 may recognize surrounding obstacles and limit the unfolding of the side mirror 120 based on the location of the recognized obstacle. This will be explained in detail later.

Upon concluding that the distance with the terminal 3 exceeds the first reference distance, the vehicle may turn off the light 117, turn off the puddle lamp 118, or fold the side mirrors 120.

As shown in FIG. 1, the remote controller 2 may include a fob-type remote controller 2*a* and a card-type remote controller 2*b*, and communicate with the vehicle 1 in two-way.

The remote controller 2*a* and 2*b* (collectively, 2) automatically communicates with the vehicle 1 through at least one of the plurality of antennae 201 or 202 when the remote controller 2 locates the outside of the vehicle and within a predetermined distance from the vehicle, and at the instant time, in response to a signal being received from the vehicle 1 transmit a remote key authentication signal for automatically communicating with the vehicle 1 through at least one antenna.

Herein, the remote key authentication signal of the remote controller 2 is a signal for authenticating the remote controller 2, and may include a signal for identification information of the remote controller 2 and a strength signal corresponding to the received signal strength of the antenna of the remote controller 2.

The antenna of the remote controller 2 may be one or two or more.

The antennae of the two or more remote controllers 201 and 202 may be LF antennae.

One of the antennae of the two or more remote controllers may be a LF antenna and the other thereof may be a RF antenna.

The fob-type remote controller 2*a* transmits a control signal corresponding to a user input to the vehicle 1 when the user input is received from the user after remote key authentication is successful.

If the remote key authentication is successful, the card-type remote controller 2*b* may transmit a control signal for unlocking the doors on the driver seat and passenger seat sides of the vehicle without a separate manual operation, or transmit a control signal for starting the vehicle, or transmit a control signal for unfolding the side mirror 120.

The fob-type remote controller 2*a* and the card-type remote controller 2*b* may include a LF antenna for transmitting and receiving a low frequency signal of the vehicle 1.

The remote controller 2 may further include a RF antenna for performing high-frequency communication capable of transmitting an amount of information greater than a certain amount of information and performing a short-range communication with the same power.

When the remote controller 2 is located within the first standard distance from the vehicle after successful remote key authentication, the remote controller 2 may transmit control signals to turn on the light 117, turn on the puddle lamp 118, or unfold the side mirrors 120 of the vehicle.

In other words, in addition to the remote key authentication signal, the remote controller 2 may further transmit at least one of a control signal to unlock the door, a control signal to start on the vehicle, a control signal to turn on the light 117, a control signal to turn on the puddle lamp 118, or a control signal to fold the side mirror 120.

The terminal 3 (also referred to as a user terminal) may perform user registration through an application, receive and store the electronic key (also referred to as a digital key) of the vehicle. Herein, the electronic key may include vehicle control right information. In the electronic key, information related to the terminal 3 and information related to the vehicle may be stored.

Identification information of the terminal 3 is unique identification information of the terminal 3 which is distinguished from other terminals, and may include at least one of a phone number of the terminal, a WIFI media access control (MAC) address of the terminal, a serial number, or an international mobile device identification code (IMEI).

The identification information of the terminal 3 may be Bluetooth identification information (BTID).

Vehicle information may include a vehicle's model, identification information (a license plate), a power generation method (e.g., hybrid, electric, internal combustion engine, hydrogen, etc.), a shifting method, and the like.

For example, the terminal 3 may remotely control a state of the locking member by use of the stored electronic key to switch the door of the vehicle to a locked or unlocked state, control operations of various electronic devices provided in the vehicle by use of the stored electronic key, and control the starting of the vehicle.

The terminal 3 may communicate with the vehicle 1, further receive at least one of an instruction to lock or unlock the door 115, an instruction to lock or unlock the tailgate, an instruction to turn on or off the light 117 as a user input, and transmit a control signal corresponding to the received user input to the vehicle 1.

The terminal 3 may display door locking completion or failure information corresponding to a door locking instruction, door unlocking completion or failure information corresponding to a door unlocking instruction, light lighting completion or failure information in response to a lighting instruction transmitted to the vehicle, or a remaining time until the light is turned off. Furthermore, the terminal 3 may further display information on maintenance of unfolding of the side mirrors and release of folding of the side mirrors.

The terminal 3 may also display turning ON/OFF information of the puddle lamps and folding/unfolding information of the side mirrors.

The terminal 3 may store vehicle identification information in response to terminal registration completion information being received from the vehicle.

When performing an electronic key (or digital key) function of a vehicle, the terminal 3 attempts to establish a communication connection with the vehicle.

The terminal 3 according to various exemplary embodiments of the present disclosure may communicate with a vehicle through at least one of a Bluetooth low Energy (BLE) module, an UWB module, or an NFC module.

Accordingly, the terminal 3 may include an application (i.e., an app) configured for performing a digital key function of a vehicle.

The terminal 3 may be implemented as a computer or portable terminal capable of accessing a vehicle via a network.

Herein, the computer may include, for example, a laptop provided with a web browser, a desktop, a tablet Personal Computer (PC), and a slate PC, and the like. Furthermore, the portable terminal, for example, a wireless communication device that ensures portability and mobility, and may include all types of handheld-based wireless communication device such as Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, and smart phone, and the like, and wearable devices such as watches, rings, bracelets, anklets, necklaces, glasses, contact lenses, or head-mounted-device (HMD).

FIG. 5 is a control schematic diagram of a vehicle according to an exemplary embodiment of the present disclosure, and will be described with reference to FIG. 6.

Figure 6:
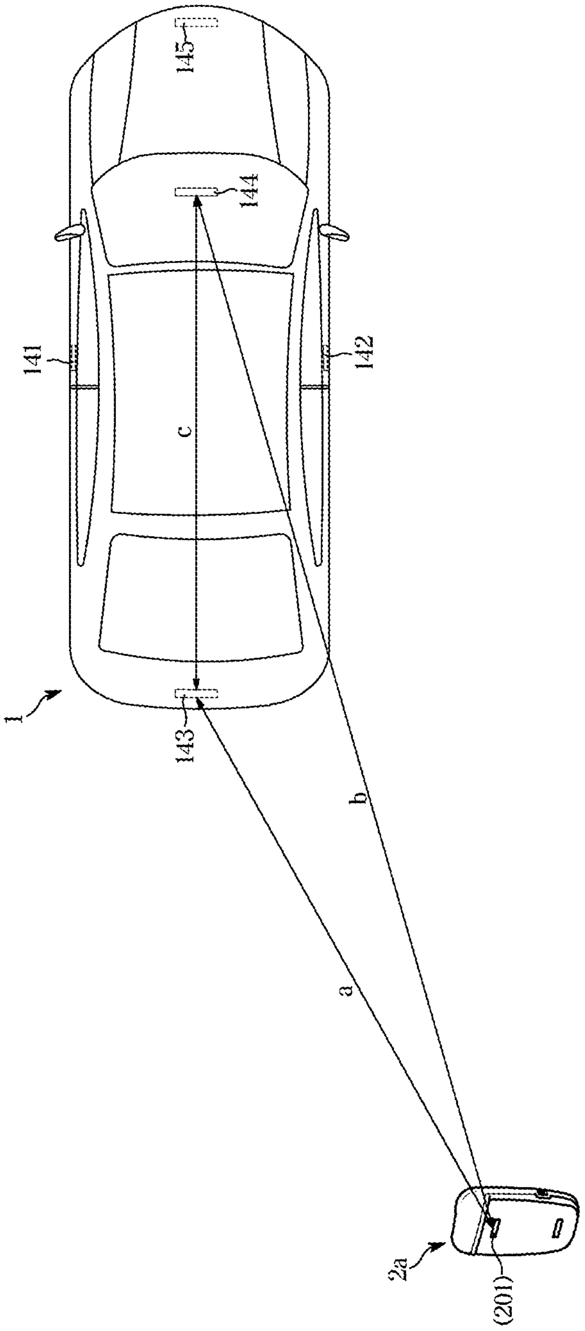
FIG. 6 is a view exemplarily illustrating recognizing a location of a remote controller through a vehicle according to an exemplary embodiment of the present disclosure.

FIG. 6 is a view exemplarily illustrating recognizing a location of the remote controller in a vehicle according to an exemplary embodiment of the present disclosure.

The vehicle 1 may include the puddle lamp 118, the side mirror 120, the adjusting member 122, the camera 130, the obstacle detector 140, the communicator 150, a driving information detector 160, the processor 180, and a memory 181.

Herein, the communicator 150, the processor 180, and the memory 181 may be components of a convenience control device for a vehicle. In the instant case, the communicator 150 of the convenience control device may perform communication between various electronic devices provided in the vehicle and the processor 180.

The puddle lamp 118 may be a lamp configured for performing a welcome function.

The puddle lamp 118 may be turned on in response to a control instruction of the processor 180 when the distance between the vehicle 1 and the remote controller 2 is less than or equal to the first reference distance.

The puddle lamp 118 may be turned on in response to a control instruction of the processor 180 when the distance between the vehicle 1 and the terminal 3 is less than or equal to the first reference distance.

The puddle lamp 118 may be turned on in response to a control instruction of the processor 180 when an ambient illumination is less than or equal to a reference illumination, the vehicle is parked, and the distance with the user is less than or equal to the first reference distance.

A thing that the distance with the user is less than or equal to the first reference distance may include the distance between the vehicle 1 and the remote controller 2 is less than or equal to the first reference distance, and the distance between the vehicle 1 and the terminal 3 is less than or equal to the first reference distance.

The puddle lamp 118 may be configured to generate light so that a logo image of a vehicle manufacturer is projected onto the ground.

The side mirror 120 may include the first side mirror 120*a* configured for securing a left rear view of the vehicle and the second side mirror 120*b* configured for securing a right rear view of the vehicle.

The first side mirror 120*a* may be provided on an exterior of the door of the driver seat side.

The second side mirror 120*b* may be provided on an exterior of the door of the front passenger seat side.

The adjusting member 122 is provided on an exterior of the door 115 and may be connected to the housing 121 of the side mirror, and may rotate and move the housing 121 of the side mirror.

The adjustment member 122 may adjust the position of the side mirror 120 using rotation of the housing 121 of the side mirror 120.

In other words, the adjusting member 122 may rotationally move the side mirror 120 from a folded position to an unfolded position and from an unfolded position to a folded position.

The adjusting member 122 may include a first adjusting member 122*a* configured for rotationally moving the first side mirror 120*a* and a second adjusting member 122*b* configured for rotationally moving the second side mirror 120*b*.

The camera 130 obtains surrounding images of the vehicle when the vehicle is in a driving state.

The camera 130 may obtain surrounding images of the vehicle when the vehicle is in a parked state.

The camera 130 may be activated in response to a control instruction of the processor 180 when the camera 130 is in the parked state and the distance with the user is less than or equal to the predetermined distance. Herein, the predetermined distance may be longer than the first reference distance, and may be a distance facilitating communication with the remote controller 2 or the terminal 3.

The camera 130 may transmit image information obtained in response to activation, to the processor 180.

The obstacle detector 140 detects an obstacle in the driving state and transmits obstacle information related to the detected obstacle to the processor 180.

The obstacle detector 140 may also detect an obstacle in the parking state.

The obstacle detector 140 may be activated in response to a control instruction of the processor 180 when the vehicle is in the parked state and the distance with the user is less than or equal to the predetermined distance. Herein, the predetermined distance may be longer than the first distance, and may be a distance facilitating communication with the remote controller 2 or the terminal 3.

The obstacle detector 140 transmits obstacle information obtained in response to activation to the processor 180. The obstacle information may include location information of the obstacle. The location information of the obstacle may include distance information with the obstacle and direction information of the obstacle.

The communicator 150 may communicate with at least one of the remote controller 2 or the terminal 3. The communicator 150 may perform communication between components inside the vehicle.

The communicator 150 may further include a Global Positioning System (GPS) receiver configured for obtaining current location information of the vehicle.

Among the configurations of the puddle lamp 118, the side mirror 120, the adjusting member 122, the camera 130, the obstacle detector 140, and the communicator 150, the configuration described with reference to FIGS. 1, 2, 3, and 4 will be omitted herein.

The driving information detector 160 may detect driving speed information of the vehicle, steering information, and gear shifting information regarding vehicle's driving.

The driving information detector 160 may include at least one of an angular velocity detector configured for detecting an angular velocity of a steering wheel for detecting a steering angle of a vehicle, a speed detector configured for detecting a traveling speed of a host vehicle, a yaw rate detector configured for detecting a yaw moment of a vehicle, or an acceleration detector configured for detecting an acceleration of a shift lever of a vehicle, and may further include a lever position detector configured for detecting manipulation position information of the shift lever.

The speed detector may be a wheel speed sensor provided on front, rear, left and right wheels or an acceleration sensor configured for detecting an acceleration of a vehicle.

The speed detector may include a plurality of wheel speed sensors that output detection information (i.e., wheel speed information) corresponding to the rotation speed of wheels provided on the front, rear, left and right wheels of the vehicle.

The speed detector may also include an acceleration sensor that outputs detection information corresponding to an acceleration of the vehicle (i.e., acceleration information).

The speed detector may also include the plurality of wheel speed sensors and the acceleration sensor.

The driving information detector 160 may further include an illuminance detector which is configured to detect illumination information regarding driving environments.

The vehicle may further include an occupant detector which is configured to detect a presence of occupants and the number of occupants.

The occupant detector may be provided on a seat and seat belt of the vehicle.

The occupant detector may include at least one of a weight detector, a pressure detector, a capacitance detector, or a safety belt fastening detector.

The processor 180 may be configured to determine whether the vehicle is in an ignition-on state or an ignition-off state, and determine a state of the vehicle as the parked state upon concluding that the vehicle is in the ignition-off state.

When the vehicle is in the ignition-off state, the processor is configured for determining whether the user has gotten off the vehicle.

The processor 180 may be configured to determine whether the user exists outside the vehicle or inside the vehicle through communication with the remote controller 2, and upon concluding that the user exists outside the vehicle, determine that the user has gotten off the vehicle.

The processor 180 may be configured to determine whether the user exists outside the vehicle or inside the vehicle through communication with the terminal 3, and upon concluding that the user exists outside the vehicle, is configured to determine that the user has gotten off the vehicle.

The processor 180 may be configured to determine that the user has gotten off the vehicle based on door opening/closing information.

The processor 180 may also determine whether the vehicle is parked based on the gear shifting information and the driving speed information detected by the driving information detector 160.

The processor 180 may also determine whether the user has gotten off the vehicle based on the occupant information detected by the occupant detector.

The processor 180 may be configured to determine whether the vehicle is in the driving state or the parked state based on at least one of ignition ON/OFF information, driving information, or occupant getting ON/OFF information.

Upon concluding that the vehicle is parked, the processor 180 may control the adjusting member 122 to fold the side mirror 120.

The processor 180 may identify the distance information with the user upon concluding that the user has gotten off the vehicle, control the adjusting member 122 to fold the side mirror 120 upon concluding that the distance between the vehicle and the user exceeds a predetermined distance based on the identified distance information, and deactivate the camera 130 and the obstacle detector 140.

The processor 180 may activate the camera 130, the obstacle detector 140, and the communicator 150 upon concluding that the vehicle is parked.

The processor 180 may recognize, upon concluding that the vehicle is parked, the distance information with the user, determine whether the distance with the user is less than or equal to a predetermined distance based on the recognized distance information, and upon concluding that the distance with the user is less than or equal to the predetermined distance, also activate the camera 130, the obstacle detector 140, and the communicator 150.

The processor 180 may, when the vehicle is in the parked state, attempt a communication connection with the remote controller 2, obtain the distance information with the remote controller 2 based on the received signal strength of the remote controller 2 upon concluding that the communication connection with the remote controller 2 is available, and determine the distance with the user based on the obtained distance information with the remote controller 2.

The processor 180 may, when the vehicle is in the parked state, attempt a communication connection with the remote controller 2, identify a rank of communication connection with the remote controller 2 for a plurality of antennae upon concluding that the communication connection with the remote controller 2 is available, identify an antenna having the fastest communication connection rank, and obtain the direction information of the user based on the location of the identified antenna.

The processor 180 may also obtain a walking path of the user based on changes in communication connections with the remote controller 2 for the plurality of antennae.

The processor 180 may attempt the communication connection with the terminal 3 when the vehicle is parked, obtain the distance information with the terminal 3 based on the received signal strength of the terminal 3 upon concluding that the communication connection with the terminal 3 is available, and determine the distance with the user based on the obtained distance information with the terminal 3.

The processor 180 may obtain information on the current location of the vehicle when the vehicle is parked, attempt the communication connection with the terminal 3, receive the location of the terminal from the terminal 3 upon concluding that the communication connection with the terminal 3 is available, obtain the distance information with the terminal 3 based on the current location information of the vehicle 1 and the current location information of the terminal 3, and determine the distance with the user based on the obtained distance information to the terminal 3.

The processor 180 may obtain the direction information of the user based on the current location information of the vehicle 1 and the current location of the terminal 3, and also obtain the walking path of the user based on changes in the location information of the terminal 3.

The processor 180 may recognize a person based on the image information obtained through the camera 130, determine whether the recognized person is the user based on the recognized person's body information and pre-stored user's body information, and upon concluding that the person is the user, also determine the distance with the user based on the image information obtained through the camera 130.

Herein, body information regarding a human may include height information, body shape information, gender information, face information, gait information, and voice information, and the like.

In response to the user being recognized according to the image information obtained through the camera 130, the processor 180 may also determine the distance with the user based on the obstacle information detected by the obstacle detector 140.

The processor 180 may also obtain the direction information and the walking path of the user based on the image information of the camera 130 obtained for each period.

The processor 180 may also recognize a type of obstacle based on the image information obtained by the camera 130. For example, the types of obstacles may include other vehicles, walls, pillars, bikes, streetlights, and utility poles, and the like.

The processor 180 may obtain the direction information of the user from the obstacle information detected by the obstacle detector 140 and may also obtain the walking path of the user based on changes in distances with the user.

When the obstacle detector includes a plurality of radar sensors provided at different locations on the exterior of the vehicle, the processor 180 may recognize the distance between each radar sensor and the user based on the obstacle information received from the plurality of radar sensors, determine the radar sensor recognizing the closest distance among the distances between each radar sensor and the user and identify identification information of the determined radar sensor, determine location information of the vehicle body on which the identified radar sensor is mounted based on the identified identification information of the radar sensor, and obtain the direction information of the user based on the determined location information of the vehicle body.

The processor 180 may identify a change in distance between each radar sensor and the user for each period, and obtain the walking path of the user based on a change in distance with each radar for each period.

For example, if there are 6 radar sensors, the processor 180 may obtain the walking path of the user based on a change in distance between a first radar sensor and the user, a change in distance between a second radar sensor and the user, a change in distance between a third radar sensor and the user, a change in distance between a fourth radar sensor and the user, a change in distance between a fifth radar sensor and the user, and a change in distance between a sixth radar sensor and the user.

As shown in FIG. 6, the processor 180 may obtain the direction information and the walking path of the user based on distance information between at least two of the plurality of antennae 141 to 145 or the remote controller 2.

The processor 180 may identify distance information between the two antennae 143 and 144 among information stored in the memory 181, and obtain the direction information and the walking path of the user based on distance information a between the third antenna 143 and the remote controller 2, distance information b between the fourth antenna 144 and the remote controller 2*a*, and distance information c between the two antennae 143 and 144.

The processor 180 may obtain the direction information and the walking path of the user by use of a trigonometric function.

The processor 180 may be configured to determine whether the user approaches the vehicle with an intention to get on based on at least one of the distance information with the user, the direction information of the user, or the walking path of the user.

Upon concluding that the distance with the user is less than or equal to the first reference distance, the processor 180 recognizes location information of obstacles around the vehicle based on the obstacle information detected by the obstacle detector 140. Herein, the location information of the obstacles may include distance information with the obstacle and direction information of the obstacle.

The processor 180 may be configured to determine whether the distance has changed based on information on the distance with the obstacle for each period, and determine whether the obstacle is a fixed obstacle or a stopped obstacle in response to whether the distance has changed.

The processor 180 may obtain distance information between the obstacle and the door 115 of the vehicle based on pre-stored distance information between the obstacle detector 140 and the door 115 and distance information with the obstacle.

The processor 180 may also obtain distance information between the obstacle and the folded side mirror based on pre-stored distance information between the obstacle detector 140 and the side mirror 120 and distance information with the obstacle.

In an exemplary embodiment of the present disclosure, an example of unfolding control or limiting control of the side mirror based on distance information between the obstacle and the obstacle detector 140 of the vehicle will be described.

The processor 180 may obtain distance information with the obstacle on the left side and/or right side (door sides) of the vehicle based on the obstacle information.

The processor 180 may be configured to determine whether the distance with the obstacles on the left and right sides is less than or equal to a second reference distance based on distance information with the obstacles on the left and right sides, and upon concluding that the distance with the obstacle exceeds the second reference distance, control the adjusting member 122 to control unfolding of the side mirrors 120.

When controlling the unfolding of the side mirrors 120, the processor 180 may also control turning on the puddle lamps 118.

When controlling the unfolding of the side mirrors 120, the processor 180 may identify ambient illumination information detected by the illuminance detector, determine whether the ambient illumination is less than or equal to a reference illumination based on the identified ambient illumination information, and control the lighting of the puddle lamp 118 upon concluding that the ambient illumination is less than or equal to the reference illumination.

The processor 180 may be configured to determine whether the user has gotten in based on the detection information of the occupant detector or the opening/closing information of the door 115, and control turning off the puddle lamp 118 upon concluding that the user has gotten in.

When controlling the unfolding of the side mirror 120, the processor 180 may control the unfolding of the first side mirror 120*a* upon concluding that the distance between the left side of the vehicle body and the obstacle exceeds the second reference distance, and control the unfolding of the second side mirror 120*b* upon concluding that the distance between the right side of the vehicle body and the obstacle exceeds the second reference distance.

The processor 180 may control the adjusting member 122 to limit the unfolding of the side mirror 120 upon concluding that the distance with the obstacle is less than or equal to the second reference distance. In other words, the processor 180 may control the folding of the side mirrors 120 to be maintained upon concluding that the distance with the obstacle is less than or equal to the second reference distance.

When controlling the folding of the side mirror 120 to be maintained, the processor 180 may control the folding of the first side mirror 120*a* to be maintained upon concluding that the distance between the left side of the vehicle body and the obstacle is less than or equal to the second reference distance, and control the folding of the second side mirror 120*b* to be maintained upon concluding that the distance between the right side of the vehicle body and the obstacle is less than or equal to the second reference distance.

The processor 180 may be configured to determine whether the user has gotten in based on the detection information of the occupant detector or the opening/closing information of the door upon concluding that at least one side mirror 120 is in the folded state, or determine whether the vehicle is in the driving state based on the driving information of the driving information detector 160 upon concluding that the user has gotten in.

The processor 180 may be configured to determine whether to leave a parking space based on at least one of the gear shifting information, the driving speed information, or the steering information upon concluding that the at least one side mirror 120 is in the folded state, obtain the distance information between the sides of the vehicle body and the obstacles based on the obstacle information detected by the obstacle detector 140 upon concluding that the vehicle is leaving the parking space, and control the unfolding of at least one side mirror 120 upon concluding that the distance between the sides of the vehicle body and the obstacles exceed the second reference distance based on the obtained distance information.

In other words, the processor 180 may perform unfolding control for the side mirror maintained in the folded state based on the obstacle information detected by the obstacle detector 140 while exiting.

The processor 180 may be configured to determine whether the parked state of the vehicle is a rear parked state or a front parked state, determine the traveling direction of the vehicle when exiting based on the determined parked state, identify the obstacle detector 140 and the camera 130 disposed in the determined traveling direction of the vehicle, predict a side obstacle adjacent to the sides of the vehicle among the obstacles present in the traveling direction of the vehicle based on at least one of the identified obstacle information of the obstacle detector 140 or the image information of the camera 130, and control at least one side mirror to be maintained in the folded state based on the obstacle information on the predicted obstacle.

When the vehicle is in the parked state, the processor 180 may is configured to determine whether a side obstacle exists within a predetermined distance from the front panel 111 of the vehicle based on the obstacle information upon concluding that the distance with the user is less than or equal to the first standard distance and the distance with the side obstacle exceeds the second reference distance in the parking state, predict a distance between the sides of the vehicle body and the side obstacle when driving straight by exiting based on the obstacle information on the side obstacle upon concluding that the side obstacle exists, determine whether the predicted distance is less than or equal to the second reference distance, and control the folding of the side mirrors to be maintained upon concluding that the predicted distance is less than or equal to the second reference distance. Herein, the sides of the vehicle body may include the left side surface and the right side face of the vehicle body.

The side obstacle is an obstacle positioned on any one of the sides of the vehicle body, and may be an obstacle present on a surface facing the driver seat side door and the front passenger seat side door.

The processor 180 may be configured to determine whether a side obstacle exists within a predetermined distance from the rear panel 114 of the vehicle based on the obstacle information upon concluding that the distance with the user is less than or equal to the first reference distance and the distance with the side obstacle exceeds the second reference distance in the parked, predict the distance between the sides of the vehicle body and the side obstacle when traveling backward by exiting based on the obstacle information on the side obstacle upon concluding that the side obstacle exists, determine whether the predicted distance is less than or equal to the second reference distance, and control the side mirrors to be maintained in the folded state upon concluding that the predicted distance is less than or equal to the second reference distance.

The processor 180 may switch the side mirror 120 to be in the unfolded state upon concluding that the distance with the user is less than or equal to the first reference distance and the distance with a side obstacle exceeds the second reference distance in the parked state, determine whether a side obstacle exists within a predetermined distance from the front panel 111 of the vehicle based on the obstacle information detected by the obstacle detector 140 upon concluding that the user has gotten in, predict the distance between the sides of the vehicle body and the side obstacle when driving straight by exiting based on the obstacle information on the side obstacle upon concluding that the side obstacle exists, determine whether the predicted distance is less than or equal to the second reference distance, and switch the side mirror 120 to be in the folded state upon concluding that the predicted distance is less than or equal to the second reference distance.

The processor 180 may switch the side mirror 120 to be in the unfolded state upon concluding that the distance with the user is less than or equal to the first reference distance and the distance with a side obstacle exceeds the second reference distance in the parked state, determine whether a side obstacle exists within a predetermined distance from the rear panel 114 of the vehicle based on the obstacle information detected by the obstacle detector 140 upon concluding that the user has gotten in, predict the distance between the sides of the vehicle body and the side obstacle when travelling backward by exiting based on the obstacle information on the side obstacle upon concluding that the side obstacle exists, determine whether the predicted distance is less than or equal to the second reference distance, and switch the side mirror 120 to be in the folded state upon concluding that the predicted distance is less than or equal to the second reference distance.

The processor 180 may output guide information indicating that the side mirror 120 in the unfolded state is switched back to the folded state through the display or a speaker.

The processor 180 may switch the side mirror 120 to be in the unfolded state upon concluding that the vehicle has passed through the side obstacle when exiting in forward or reverse motion.

Herein, 'exiting' refers to leave the parking space in which the vehicle is parked.

The processor 180 may be configured to determine whether a side obstacle exists within a predetermined distance from the front panel 111 based on the image information obtained by the front camera among cameras upon concluding that the distance with the user is less than or equal to the first reference distance and the distance with the side obstacle exceeds the second reference distance in the parked state, and also determine whether the side obstacle exists within a predetermined distance from the rear panel 114 based on the image information obtained by the rear camera.

Herein, the predetermined distance may be a distance determined by a distance (e.g., second reference distance) at which a side mirror of the vehicle may come into contact with an obstacle when the vehicle travels forward or backward thereof.

The processor 180, when the user has gotten in the vehicle, may be configured to determine whether the side obstacle exists within a predetermined distance from the front panel 111 based on the image information obtained by the front camera among cameras, and also determine whether the side obstacle exists within a predetermined distance from the rear panel 114 based on the image information obtained by the rear camera.

The processor 180 may be configured to determine whether the distance with the obstacle is less than or equal to the second reference distance based on the obstacle information in response to the unfolding instruction of the side mirror being received from the remote controller or the terminal in the parked state, control the adjusting member to maintain the side mirror in the folded state upon concluding that the distance with the obstacle is less than or equal to the second reference distance, and control the adjusting member to switch the side mirror to be in the unfolded state upon concluding that the distance with the obstacle exceeds the second reference distance.

The memory 181 may store the user's body information, store the information on first and second reference distances and the predetermined distances, and store the information on the certain distance.

The memory 181, may further store angle information of side mirrors for each user, further store the identification information of the remote controller 2 and the identification information of the terminal 3, and may store the electronic key information.

The memory 181 may store the identification information and the location information of the plurality of antennae 141 to 145 and may store the distance information between the plurality of antennae.

The memory 181 may store the distance information between the obstacle detector 140 and the side mirror 120 and may store the distance information between the obstacle detector 140 and the door 115.

The memory 181 may be implemented as at least one of a nonvolatile memory device such as a cache, a read only memory (ROM), a programmable ROM (PROM), an erasable programmable ROM (EPROM), an electrically erasable programmable ROM (EEPROM), and flash memory, or a volatile memory device such as a random access memory (RAM), or a storage medium such as a Hard Disk Drive (HDD), a compact disk (CD-ROM), but is not limited thereto.

The memory 181 may be implemented as a separate chip from the processor described above with respect to the processor 180, or may be implemented as a single chip with the processor.

At least one component may be added or deleted according to performance of the components of the vehicle and the control device for convenience equipment shown in FIG. 5. Furthermore, it will be readily understood by those of ordinary skill in the art that mutual positions of the components may be changed corresponding to the performance or structure of the system.

On the other hand, each component shown in FIG. 5 may refer to software and/or hardware components such as a field programmable gate array (FPGA) and an application specific integrated circuit (ASIC).

Figure 7:
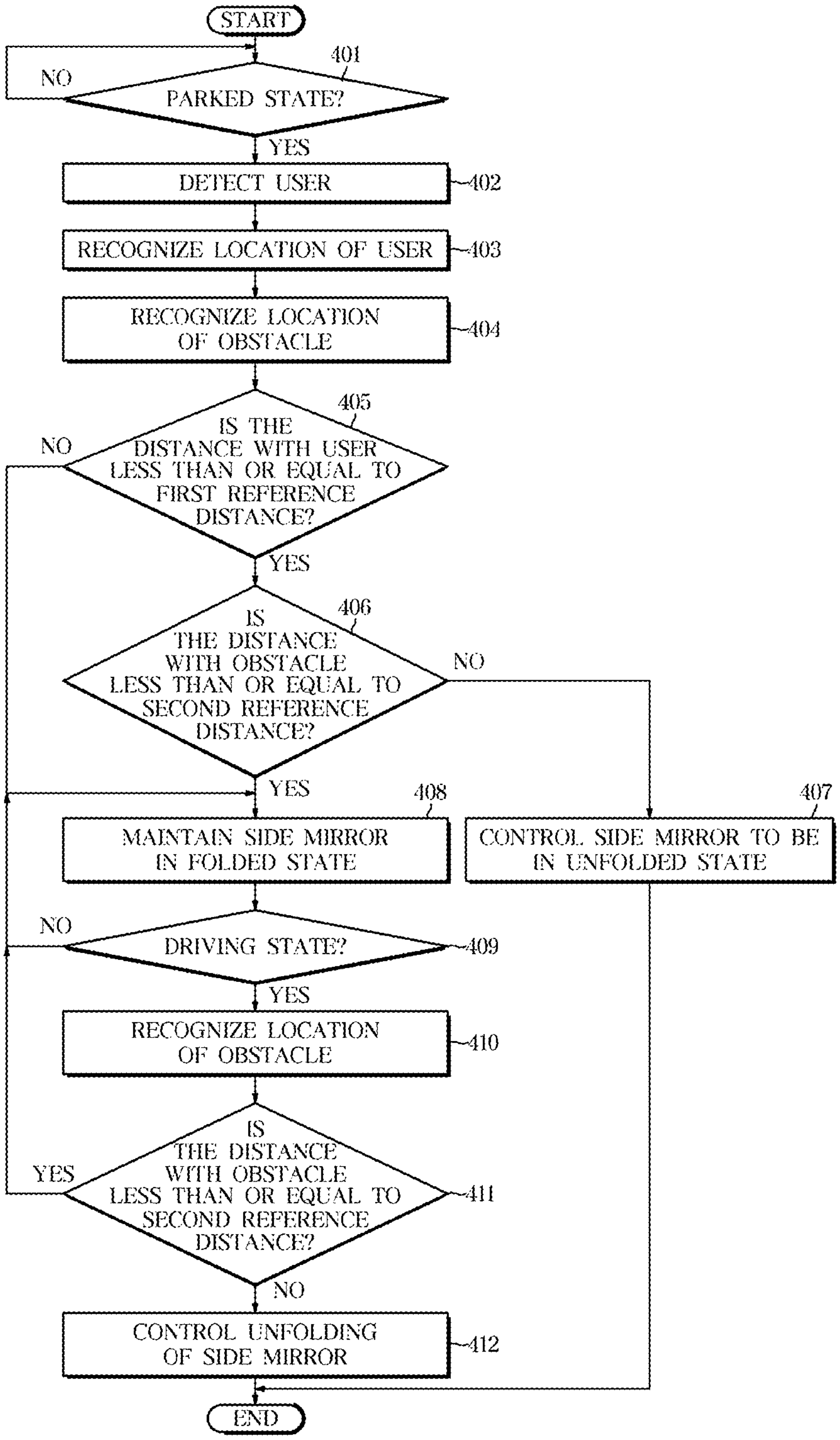
FIG. 7 is a control flowchart illustrating a vehicle according to an exemplary embodiment of the present disclosure.

FIG. 7 is a control flow chart illustrating a vehicle according to an exemplary embodiment of the present disclosure, and will be described with reference to FIG. 8, FIG. 9, FIG. 10 and FIG. 11.

FIG. 8, FIG. 9, FIG. 10 and FIG. 11 are views exemplarily illustrating controlling side mirrors of a vehicle to a folded state or an unfolded state according to an exemplary embodiment of the present disclosure.

The vehicle may be configured to determine whether the vehicle is in the ignition-on state or the ignition-off state, and upon concluding that the vehicle is in the ignition-off state, determine whether the user has gotten off the vehicle.

The vehicle may be configured to determine that the vehicle is in the parked state upon concluding that the user has gotten off the vehicle after the ignition is turned off (401).

In the parked state, the vehicle may detect the user's approach through at least one of the first communication module or the second communication module of the communicator 150 (402).

Detecting the user's approach may include determining whether the distance between the vehicle and the user falls within a predetermined distance.

Furthermore, detecting the user's approach may include determining whether communication between the vehicle 1 and the remote controller 2 and communication between the vehicle 1 and the terminal 3 are available.

For example, when transmitting LF search signal through the first communication module, the vehicle may sequentially transmit the LF search signal through the plurality of antennae 141-145 provided in the first communication module but sequentially transmit the LF search signal based on a predetermined order.

The vehicle may first transmit the LF search signal through the first antenna 141, then transmit the LF search signal through the second antenna 142, next transmit the LF search signal through the third antenna 143, after that transmit the Lf search signal through the fourth antenna 144, finally transmit the LF search signal through the fifth antenna 145.

After transmitting the LF search signal, the vehicle may identify an antenna close to the user based on a reception time when a RF response signal is received, and detect the user's approach based on the location of the identified antenna.

After transmitting the LF search signal, the vehicle may identify a reception order of the response signals for each antenna based on the reception time when the RF response signals are received, and detect the direction and the walking path of the user based on the reception order of the identified response signals.

For example, in response to the RF response signals being received after transmitting the LF search signal through the first antenna 141, the vehicle may be configured to determine that the user, that is, the remote controller, has approached the vehicle body provided with the first antenna, and in response to the RF response signals being received after transmitting the LF search signal through the second antenna 142, the vehicle may be configured to determine that the user, that is, the remote controller, has approached the vehicle body provided with the second antenna.

Upon concluding that the first priority is the fifth antenna and the second priority is the first antenna in the reception order of the RF response signals, the vehicle may be configured to determine that the direction of the user has moved from the center portion of the vehicle body to the left side of the vehicle body, so that the walking path in which the user walks from the center portion of the vehicle body to the driver seat side may be obtained.

Furthermore, in response to the RF response signals transmitted from the remote controller 2 being received through the first communication module, the vehicle may obtains the distance information with the remote controller 2 based on the received RF response signals, obtain the location information of the antenna based on the identification information of the antenna from which the response signal is received, obtain the direction information of the remote controller 2 based on the obtained location information of the antenna, and obtain the direction information of the user based on the direction information of the remote controller.

In response to the signal being received by the first communication module, the vehicle may obtain the distance information with the remote controller 2 based on the received signal strength of the received signal. Furthermore, based on the obtained distance information with the remote controller 2, the vehicle may deactivate the camera 130 and the obstacle detector 140 upon concluding that the distance with the remote controller 2 exceeds the predetermined distance, and activate the camera 130 and the obstacle detector 140 upon concluding that the distance with the remote controller 2 is less than or equal to the predetermined distance.

As an exemplary embodiment of the present disclosure, the vehicle may transmit a terminal search signal through the second communication module, and transmit a LF search signal through the second communication module.

When one Bluetooth antenna is provided in the second communication module, the vehicle may transmit a terminal search signal at regular intervals.

When a plurality of UWB communication antennae are provided in the second communication module, the vehicle may transmit terminal search signals sequentially through the plurality of antennae provided in the second communication module, but sequentially transmit the terminal search signals based on a predetermined order.

In response to the response signal transmitted from the terminal 3 being received through the second communication module, the vehicle may obtain the distance information with the terminal 3 based on the received response signal, obtain the location information of the antenna based on the identification information of the antenna from which the response signal is received, and obtain the direction information of the terminal 3 based on the obtained location information of the antenna.

Accordingly, the vehicle may recognize the location of the user through communication information with the remote controller 2 or communication information with the terminal 3 (403).

The vehicle may periodically recognize the location of the user. In other words, the vehicle may periodically obtain the distance information with the user, the direction information of the user, and the walking path information with the user.

The vehicle may be configured to determine whether the user approaches the vehicle with an intention to get in based on at least one of the distance information with the user, the direction information of the user, or the walking path of the user.

The vehicle may deactivate the camera 130 and the obstacle detector 140 upon concluding that the distance with the terminal 3 exceeds the predetermined distance based on the distance information with the terminal 3, and activate the camera 130 and the obstacle detector 140 upon concluding that the distance with the terminal 3 is less than or equal to the predetermined distance.

The vehicle may obtain the image information through the activated camera 130 and obtain the obstacle information through the activated obstacle detector 140.

The vehicle may recognize the location of the obstacle based on at least one of the image information obtained by the camera 130 or the obstacle information detected by the obstacle detector 140 (404). Herein, recognizing the location of the obstacle may include recognizing distance information with the obstacle and direction information of the obstacle.

The vehicle may periodically recognize the location of the obstacle.

The vehicle may be configured to determine whether the distance with the user is less than or equal to the first reference distance based on the communication information with the remote controller 2 or the communication information with the terminal 3 (405), and upon concluding that the distance with the user is less than or equal to the first reference distance (Yes in 405) recognize the location information of the obstacles around the vehicle based on the obstacle information detected by the obstacle detector 140. Herein, the location information of the obstacles may include distance information with the obstacles and direction information of the obstacles.

The vehicle may be configured to determine whether a side obstacle exists on the sides of the vehicle based on the location information of the obstacles around the vehicle, and obtain the distance information with the side obstacle based on the obstacle information on the side obstacle upon concluding that the side obstacle exists on the sides of the vehicle.

The vehicle is configured to determine whether the distance with the side obstacle is less than or equal to the second reference distance based on the distance information with the side obstacle (406), and upon concluding that the distance with the side obstacle exceeds the second reference distance (No in 406) control the side mirror 120 to be in the unfolded state (407).

In other words, upon concluding that the side mirrors were in the unfolded state when the vehicle was parked, the vehicle may maintain the side mirrors 120 to be in the unfolded state as the distance with the side obstacle exceeds the second reference distance. Furthermore, upon concluding that the side mirrors were in the folded state when the vehicle was parked, the vehicle may switch the side mirrors 120 to be in the unfolded state as the distance with the side obstacle exceeds the second reference distance.

At the present time, the vehicle may control the adjusting member 122 to control the side mirrors in the unfolded state.

The vehicle may also control turning on of the puddle lamp 118 when controlling the unfolding of the side mirror 120.

When controlling the unfolding of the side mirror 120, the vehicle may identify the ambient illumination information detected by the illuminance detector, determine whether the ambient illumination is less than or equal to the reference illumination based on the identified ambient illumination information, and upon concluding that the ambient illumination is less than or equal to the reference illumination, control turning on of the puddle lamp 118.

The vehicle may be configured to determine whether the user has gotten in based on the detection information of the occupant detector or the opening/closing information of the door 115, and control turning off the puddle lamp 118 upon concluding that the user has gotten in.

Upon concluding that the distance with the side obstacle is less than or equal to the second reference distance, the vehicle may control the adjusting member 122 to limit unfolding of the side mirror 120. In other words, upon concluding that the distance with the side obstacle is less than or equal to the second reference distance (Yes in 406), the vehicle may maintain the side mirror 120 in the folded state (408). At the instant time, the vehicle may control the adjusting member 122 to control the side mirrors in the folded state.

When controlling the folding and unfolding of the side mirror 120, the vehicle may control the first and second side mirrors, respectively, based on the obstacle information detected by the obstacle detector 140.

Figure 8:
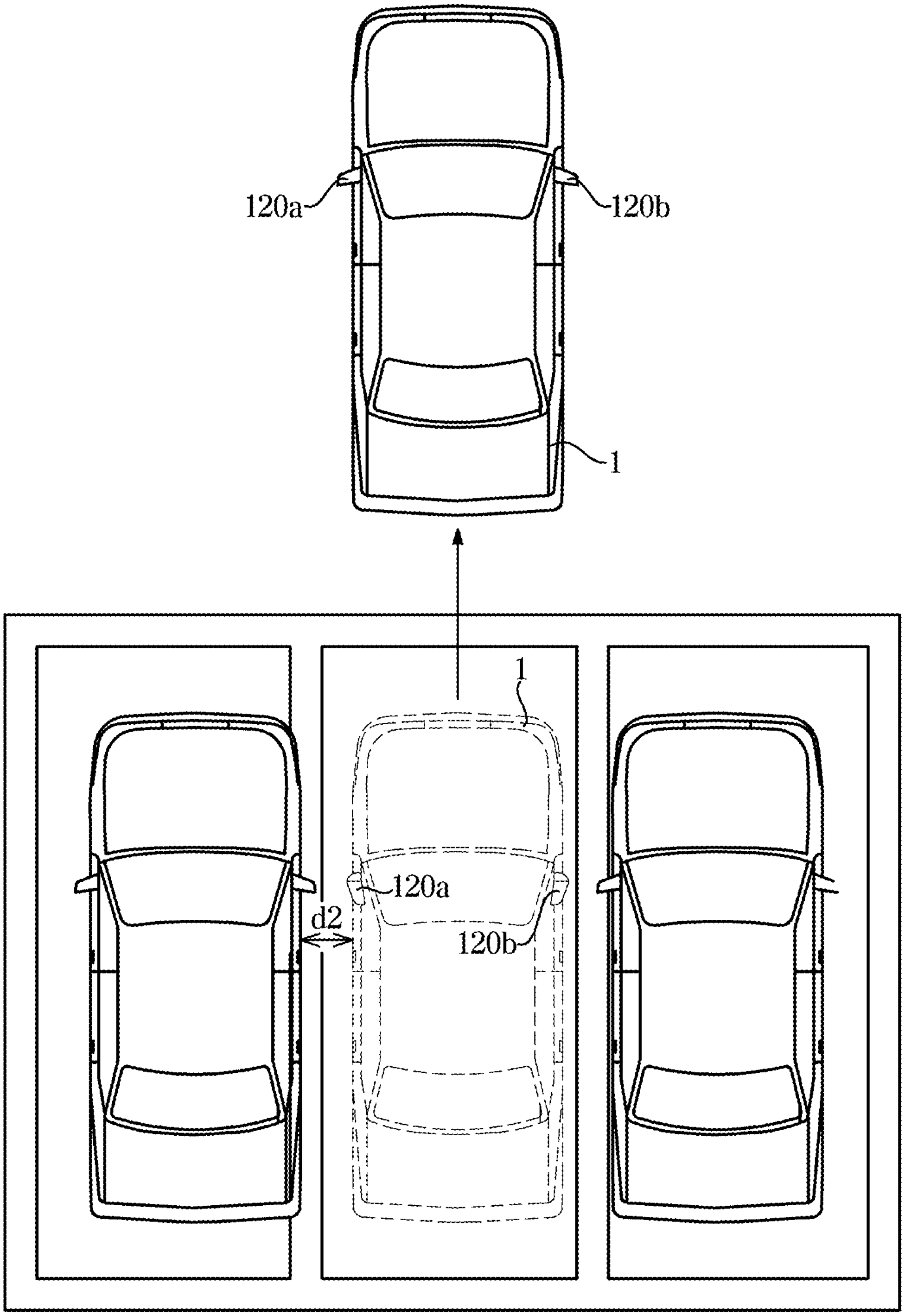
FIG. 8, FIG. 9, FIG. 10 and FIG. 11 are views exemplarily illustrating controlling side mirrors of a vehicle in a folded state or an unfolded state according to an exemplary embodiment of the present disclosure.

As shown in FIG. 8, the vehicle may be configured to determine the existence of side obstacles on the left and right sides of the vehicle, respectively, and based on the left side obstacle information and the right side obstacle information, obtain the distance information with the left and right side obstacles of the vehicle.

The vehicle may maintain the first side mirror 120*a* to be in the folded state upon concluding that the distance between with the side obstacle on the left side of the vehicle body is less than or equal to the second reference distance d2, and maintain the second side mirror 120*b* to be in the folded state upon concluding that the distance between the right side of the vehicle body and the obstacle is less than or equal to the second reference distance d2.

Figure 9:
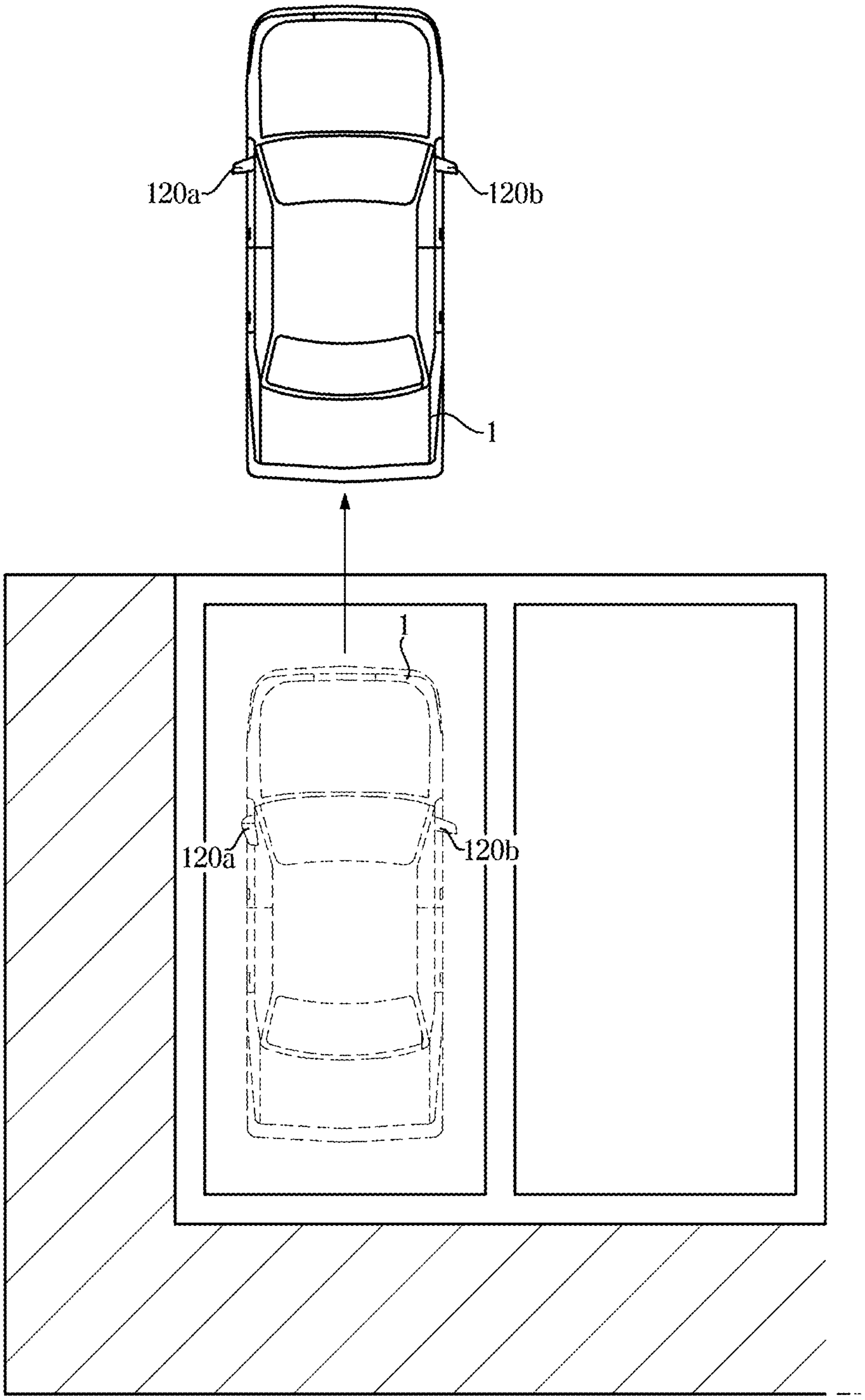

As shown in FIG. 9, the vehicle may maintain the first side mirror 120*a* in the folded state upon concluding that the distance with the side obstacle on the left side of the vehicle body is less than or equal to the second reference distance d2, and switch the right side mirror 120*b* to be in the folded state upon concluding that the distance with the side obstacle on the right side of the vehicle body exceeds the second reference distance d2.

Upon concluding that at least one side mirror 120 is in the folded state, the vehicle may be configured to determine whether or not the user has gotten in based on the detection information of the occupant detector or the opening/closing information of the door, and upon concluding that the user has gotten in, determine whether the vehicle is in the driving state based on the driving information of the driving information detector 160 (409).

Upon concluding that at least one side mirror 120 is in the folded state, the vehicle may be configured to determine whether the vehicle is in the driving state based on at least one of the shift information, the driving speed information, or the steering information. Herein, the driving state of the vehicle may be an exiting state in which the vehicle leaves the parking space.

When the vehicle is in the driving state with the side mirrors folded, the vehicle recognizes the location of the obstacle based on the obstacle information detected by the obstacle detector 140, and for example, recognizes the position of the side obstacle existing on the side of the vehicle body (410).

The vehicle may obtain the distance information with the side obstacle based on the obstacle information on the side obstacle, determine whether the distance with the side obstacle is less than or equal to the second reference distance based on the obtained distance information (411), and upon concluding that the distance with the side obstacle exceeds the second reference distance, control unfolding of at least one side mirror 120 (412).

However, upon concluding that the distance with the side obstacle is less than or equal to the second reference distance, the vehicle may maintain the side mirror 120 to be in the folded state, and continuously recognize the position of the obstacle.

In other words, the vehicle may perform unfolding control for side mirrors maintained in the folded state based on the obstacle information detected by the obstacle detector 140 while exiting.

As shown in FIG. 8, the vehicle may switch the first side mirror 120*a* to be in the unfolded state upon concluding that the distance with the side obstacle on the left side of the vehicle body exceeds the second standard distance when the vehicle is exiting, and switch the second side mirror 120*b* to be in the unfolded state upon concluding that the distance between the right side of the vehicle body and the obstacle exceeds the second standard distance d2 when the vehicle is exiting.

As shown in FIG. 9, the vehicle may switch the first side mirror 120*a* to be in the unfolded state upon concluding that the distance with the side obstacle on the left side of the vehicle body exceeds the second reference distance d2 when the vehicle exiting.

The vehicle may be configured to determine whether the parked state of the vehicle is a rear parked state or a front parked state, determine the traveling direction of the vehicle when exiting based on the determined parked state, identify the obstacle detector 140 and the camera 130 disposed in the determined traveling direction of the vehicle, predict a side obstacle approaching the sides of the vehicle among the obstacles present in the traveling direction of the vehicle based on at least one of the identified obstacle information of the obstacle detector 140 or the image information of the camera 130, and control at least one side mirror to be maintained in the folded state based on the obstacle information on the predicted obstacle.

Figure 10:
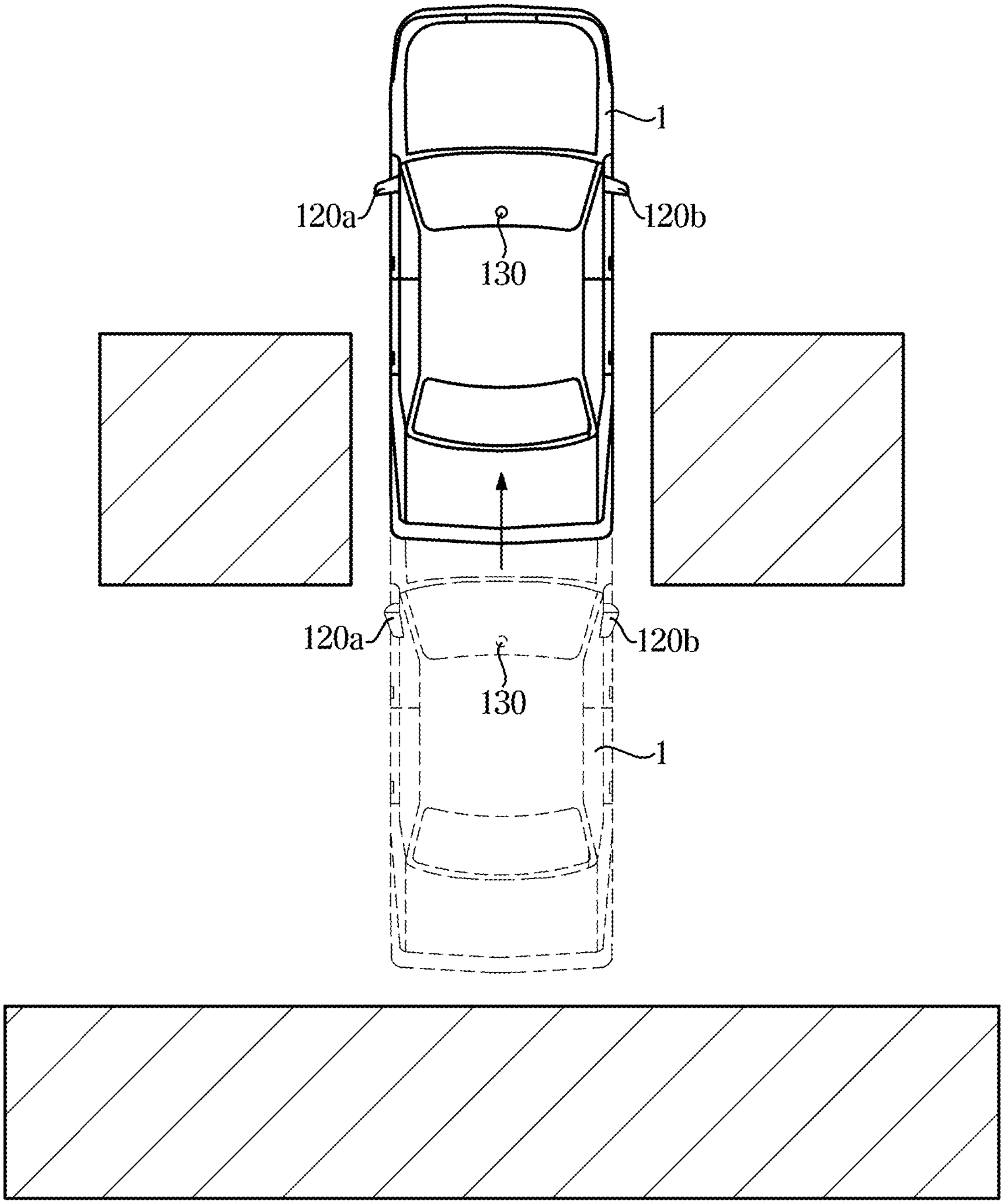

As shown in FIG. 10, upon concluding that the vehicle is parked, the distance with the user is less than or equal to the first reference distance, and the distance with the side obstacle exceeds the second reference distance, the vehicle may is configured to determine the parked state of the vehicle based on at least one of the obstacle information detected by the obstacle detector 140 or the image information obtained by the camera 130, and upon concluding that the vehicle is in the rear parked state is configured to determine whether the side obstacle exists on the left and right front sides of the vehicle body within a predetermined distance from the front panel 111 of the vehicle based on the at least one of the obstacle information detected by the obstacle detector 140 or the image information obtained by the camera 130.

The vehicle may be configured to determine whether or not the user has gotten in the vehicle upon concluding that each side obstacle exists on the left and right front sides of the vehicle, predict the distances with the left and right side obstacles based on the obstacle information on the side obstacles on the left and right front sides of the vehicle, respectively upon concluding that the user has gotten in the vehicle, determine whether the predicted distances with the left and right side obstacles are less than or equal to the second reference distance, and upon concluding that the predicted distances with the left and right side obstacles are less than or equal to the second reference distance maintain the first and second side mirrors 120*a* and 120*b* to be in the folded state.

The vehicle may monitor the locations of side obstacles on the left and right front sides of the vehicle body based on at least one of the obstacle information detected by the obstacle detector 140 or the image information obtained by the camera 130 while exiting, and upon concluding that the distance with the side obstacles on the left and right sides of the vehicle body exceeds the second reference distance d2 while monitoring, switch the first and second side mirrors 120*a* and 120*b* to be in the unfolded state.

Figure 11:
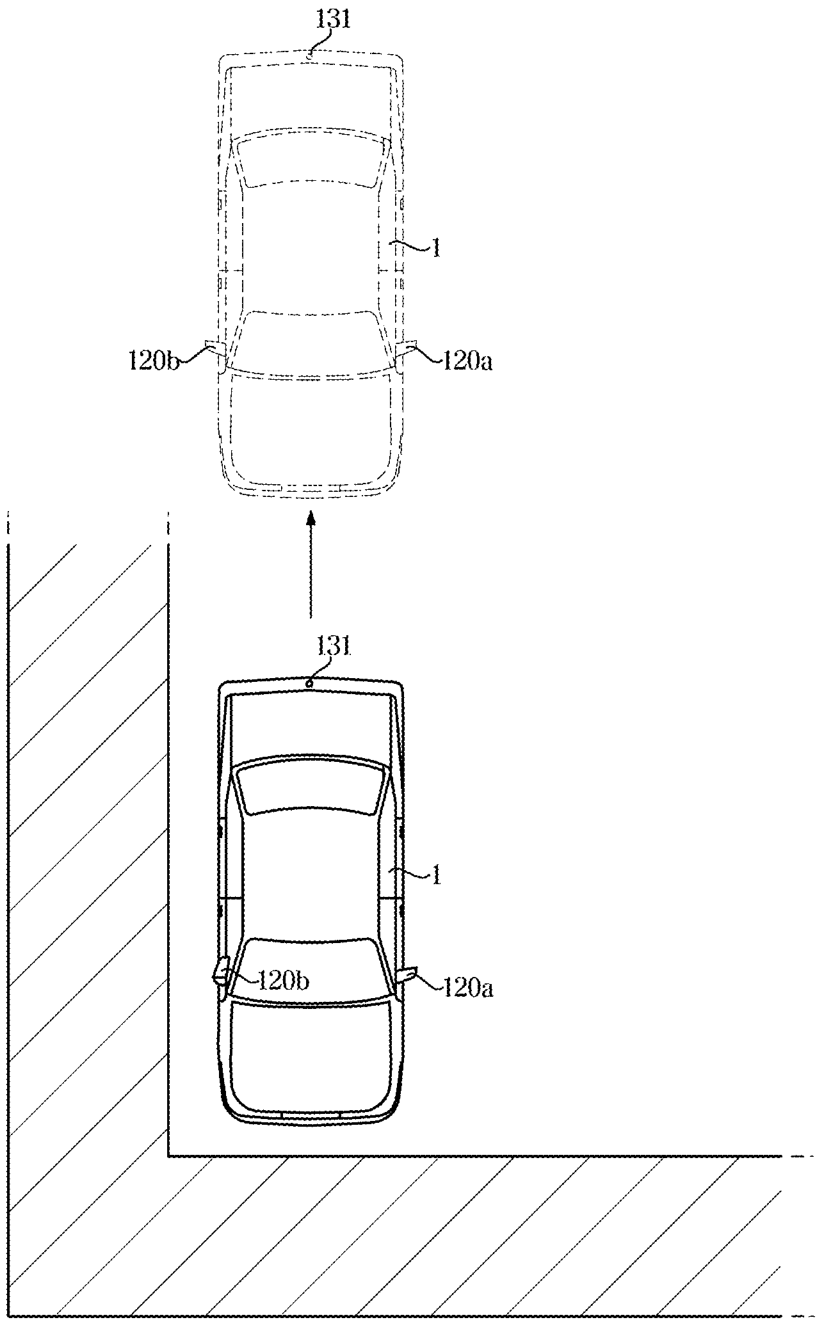

As shown in FIG. 11, upon concluding that the vehicle is in the front parked state, the vehicle may be configured to determine whether the side obstacle exists on the left and right rear sides of the vehicle within a predetermined distance from the rear panel 114 of the vehicle based on at least one of the obstacle information detected by the obstacle detector 140 or the image information obtained by the rear camera 131.

Upon concluding that the side obstacle exists on the right side of the vehicle body in the front parked state, the vehicle may be configured to determine whether the distance with the side obstacle on the right side is less than or equal to the second reference distance based on the obstacle information on the side obstacles on the right side thereof, and upon concluding that the distance with the side obstacle on the right side is less than or equal to the second reference distance, maintain the second side mirror 120*b* to be in the folded state and switch the first side mirror 120*a* to be in the unfolded state. At the instant time, the puddle lamp provided in the first side mirror may be turned on.

The vehicle may be configured to determine whether or not the user gets in, determine whether or not to drive in reverse upon concluding that the user gets in, determine whether the distance with the side obstacle on the right side is less than or equal to the second reference distance based on the obstacle information on the side obstacle on the right side upon concluding that the vehicle is in a reverse driving state, and switch the second side mirror 120*b* to be in the unfolded state upon concluding that the distance with the side obstacle on the right side exceeds the second reference distance.

As is apparent from the above, various embodiments of the present disclosure may prevent the side mirror from being damaged due to contact with an obstacle in a parked state by maintaining the folding state of the side mirrors regardless of the control of the remote controller or the terminal when the vehicle is in the parked state, the distance with the user is less than or equal to the first reference distance, and the distance between the sides of the vehicle and the obstacle is less than or equal to the second reference distance.

Furthermore, various embodiments of the present disclosure may prevent the side mirror from being damaged due to contact with the obstacle while exiting by monitoring the distance between the side of the vehicle and the obstacle while leaving the parking space and controlling the unfolding of the side mirror based on the monitoring result.

Furthermore, various embodiments of the present disclosure may prevent, when an obstacle is another vehicle, damage to another vehicle by maintaining the folding of the side mirror based on the distance with another vehicle.

Furthermore, various embodiments of the present disclosure may reduce a risk of damage to side mirrors in the parked state or when exiting, improving user convenience.

Furthermore, various embodiments of the present disclosure may improve quality and marketability of vehicles, and further improve convenience of a user and safety of a vehicle and secure product competitiveness.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed exemplary embodiments of the present disclosure may be conducted. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling a vehicle convenience equipment, the apparatus comprising:
- a communicator configured to communicate with an obstacle detector and an external device;
- a puddle lamp;
- a plurality of antennae configured to communicate with the external device;
- a camera configured to obtain an image of surrounding environments; and
- a processor communicatively connected to the communicator and configured to:
  - obtain distance information with the external device during communication with the external device;
  - determine whether a distance with the external device is less than or equal to a predetermined distance based on the distance information with the external device;

activate the camera upon concluding that the distance with the external device is less than or equal to the predetermined distance;

recognize a person based on the image obtained by the activated camera;

determine whether the person is a user based on body information of the person and pre-stored body information of the user;

determine a distance to the user based on the image and based on determining that the person is the user;

recognize, based on a communication order of the plurality of antennae communicating with the external device, a direction and a walking path of the user;

determine whether the user approaches the vehicle with an intention to get in based on the determined distance to the user and the recognized walking path of the user;

determine whether a side obstacle exists based on obstacle information detected by the obstacle detector;

obtain distance information with the side obstacle upon concluding that the side obstacle exists;

control a side mirror in a folded state to an unfolded state thereof or to maintain the folded state thereof based on the distance to the user and the distance information with the side obstacle, upon concluding that the user approaches the vehicle with the intention to get in; and transmit, based on controlling the side mirror to be in the unfolded state, a lighting instruction to the puddle lamp provided in the side mirror so that the puddle lamp generates light to project a logo image onto the ground, wherein the processor is configured to transmit the lighting instruction based on the vehicle being in a parked state, an ambient illumination being less than or equal to a reference illumination, and the distance to the user being less than or equal to a first reference distance.

2. The apparatus of claim 1, wherein the processor is further configured to:

determine whether the distance with the external device is less than or equal to the first reference distance based on the distance information with the external device;

determine whether a distance with the side obstacle is less than or equal to a second reference distance based on the obstacle information detected by the obstacle detector; and control the side mirror to maintain the folded state thereof upon concluding that the distance with the external device is less than or equal to the first reference distance and the distance with the side obstacle is less than or equal to the second reference distance.

3. The apparatus of claim 2, wherein the processor is further configured to control the side mirror to be in the unfolded state upon concluding that the distance with the external device is less than or equal to the first reference distance and the distance with the side obstacle exceeds the second reference distance.

4. The apparatus of claim 2, wherein the external device includes at least one of a remote controller or a terminal.

5. The apparatus of claim 4, wherein the processor is further configured to:

upon concluding that an unfolding instruction for the side mirror is received from the remote controller or the terminal, determine whether the distance with the side obstacle is less than or equal to the second reference distance based on the distance information with the side obstacle; and control the side mirror to maintain the folded state thereof upon concluding that the distance with the side obstacle is less than or equal to the second reference distance.

6. The apparatus of claim 1, wherein the side obstacle exists on a position facing the side mirror.

7. A vehicle, comprising:

a vehicle body;

a side mirror disposed on the vehicle body;

an adjusting member provided on the side mirror and configured to rotationally move the side mirror into a folded state or an unfolded state;

a communicator configured to communicate with an external device;

an obstacle detector configured to detect an obstacle;

a puddle lamp disposed in the vehicle body;

a plurality of antennae configured to communicate with the external device;

a camera configured to obtain an image of surrounding environments; and a processor communicatively connected to the communicator and configured to:

obtain distance information with the external device based on the vehicle being in a parked state and in a state in which communication with the external device is available;

determine whether a distance with the external device is less than or equal to a predetermined distance based on the distance information with the external device;

activate the camera upon concluding that the distance with the external device is less than or equal to the predetermined distance;

recognize a person based on the image obtained by the activated camera;

determine whether the person is a user based on body information of the person and pre-stored body information of the user;

determine a distance to the user based on the image and based on determining that the person is the user;

recognize, based on a communication order of the plurality of antennae communicating with the external device, a direction and a walking path of the user;

determine whether the user approaches the vehicle with an intention to get in based on the determined distance to the user and the recognized walking path of the user;

determine whether the obstacle exists on a side of the vehicle body based on obstacle information detected by the obstacle detector;

obtain distance information with the obstacle upon concluding that the obstacle exists;

control the adjusting member to switch the side mirror in a folded state to an unfolded state thereof or to maintain the folded state thereof based on the distance to the user and the distance information with the obstacle, upon concluding that the user approaches the vehicle with the intention to get in; and control lighting of the puddle lamp so that the puddle lamp generates light to project a logo image onto the ground based on switching the side mirror to the unfolded state, wherein the processor is configured to control the lighting of the puddle lamp based on an ambient illumination being less than or equal to a reference illumination, and the distance to the user being less than or equal to a first reference distance.

8. The vehicle of claim 7, wherein the processor is further configured to:

determine whether the distance with the external device is less than or equal to the first reference distance based on the distance information with the external device;

determine whether a distance with the obstacle is less than or equal to a second reference distance based on the obstacle information detected by the obstacle detector; and control the adjusting member to maintain the folded state of the side mirror upon concluding that the distance with the external device is less than or equal to the first reference distance and the distance with the obstacle is less than or equal to the second reference distance.

9. The vehicle of claim 8, wherein the processor is further configured to control the adjusting member to switch the side mirror to be in the unfolded state upon concluding that the distance with the external device is less than or equal to the first reference distance and the distance with the obstacle exceeds the second reference distance.

10. The vehicle of claim 8, wherein the external device includes at least one of a remote controller or a terminal, and wherein the processor is further configured to:

upon concluding that an unfolding instruction for the side mirror is received from the remote controller or the terminal, determine whether the distance with the obstacle is less than or equal to the second reference distance based on the obstacle information; and control the adjusting member to allow the folded state of the side mirror to be maintained upon concluding that the distance with the obstacle is less than or equal to the second reference distance.

11. The vehicle of claim 7, wherein the processor is further configured to:

determine whether the distance to the user is less than or equal to the first reference distance based on the recognized location of the user;

determine, upon concluding that the distance with the user is less than or equal to the first reference distance, whether a distance with the obstacle is less than or equal to a second reference distance based on the obstacle information detected by the obstacle detector; and control an adjustment member to maintain the folded state of the side mirror upon concluding that the distance with the obstacle is less than or equal to the second reference distance.

12. The vehicle of claim 11, wherein the processor is further configured to control the adjustment member to switch the side mirror to be in the unfolded state upon concluding that the distance with the user is less than or equal to the first reference distance and the distance with the obstacle exceeds the second reference distance.

13. The vehicle of claim 7, wherein the side mirror includes a first side mirror disposed on a driver seat side door and a second side mirror disposed on a passenger side door, and wherein the processor is further configured to:

determine, based on the distance information with the external device, whether the distance with the external device is less than or equal to the first reference distance;

obtain, upon concluding that the distance with the external device is less than or equal to the first reference distance, distance information with a left side obstacle and distance information with a right side obstacle existing on the left and right sides of the vehicle body;

determine, based on the obtained distance information with the left obstacle, whether a distance with the left side obstacle is less than or equal to a second reference distance;

determine, based on the obtained distance information with the right obstacle, whether a distance with the right side obstacle is less than or equal to the second reference distance;

identify a location of the side obstacle determined to be less than or equal to the second reference distance; and control the adjustment member so that the side mirror corresponding to the identified location of the side obstacle is maintained in the folded state.

14. The vehicle of claim 13, wherein the processor is further configured to:

identify the location of the side obstacle determined to exceed the second reference distance; and control the adjusting member to switch the side mirror corresponding to the identified location of the side obstacle to the unfolded state.

15. The vehicle of claim 7, wherein the processor is further configured to:

determine, when the vehicle is changed from the parked state to a driving state while the side mirror is maintained in the folded state, whether a distance with the obstacle exceeds the second reference distance based on the obstacle information detected by the obstacle detector; and control the adjusting member to switch the side mirror in the folded state to the unfolded state upon concluding that the distance with the obstacle exceeds the second reference distance.

16. The vehicle of claim 7, wherein the processor is further configured to:

when the vehicle is changed from the parked state to a driving state while the side mirror is maintained in the folded state, recognize the obstacle on left and right front sides of the vehicle body based on image information obtained by the camera; and control the adjusting member to switch the side mirror in the folded state to the unfolded state based on the recognized obstacle.

* * * * *